United States Patent
Basak et al.

(10) Patent No.: US 8,782,614 B2
(45) Date of Patent: Jul. 15, 2014

(54) VISUALIZATION OF JVM AND CROSS-JVM CALL STACKS

(75) Inventors: Indranil Basak, West Linn, OR (US); Erhan Giral, Lafayette, CA (US)

(73) Assignee: CA, Inc., Islandia, NY (US)

( * ) Notice: Subject to any disclaimer, the term of this patent is extended or adjusted under 35 U.S.C. 154(b) by 637 days.

(21) Appl. No.: 13/082,741

(22) Filed: Apr. 8, 2011

(65) Prior Publication Data

US 2012/0260236 A1 Oct. 11, 2012

(51) Int. Cl.
*G06F 9/44* (2006.01)

(52) U.S. Cl.
USPC .......................................................... 717/132

(58) Field of Classification Search
None
See application file for complete search history.

(56) References Cited

U.S. PATENT DOCUMENTS

| | | | |
|---|---|---|---|
| 5,485,616 A | 1/1996 | Burke et al. |
| 5,592,600 A | 1/1997 | De Pauw et al. |
| 6,186,677 B1 | 2/2001 | Angel et al. |
| 6,240,549 B1 | 5/2001 | Hamada et al. |
| 6,260,187 B1 | 7/2001 | Cirne |
| 6,282,701 B1 | 8/2001 | Wygodny et al. |
| 6,338,159 B1 | 1/2002 | Alexander, III et al. |
| 6,584,501 B1 | 6/2003 | Cartsonis et al. |
| 6,792,460 B2 | 9/2004 | Oulu et al. |
| 6,857,120 B1 | 2/2005 | Arnold et al. |
| 6,996,806 B2 | 2/2006 | Bates et al. |
| 7,003,781 B1 | 2/2006 | Blackwell et al. |
| 7,203,624 B2 | 4/2007 | Warshawsky |
| 7,260,567 B2 | 8/2007 | Parikh et al. |
| 7,281,170 B2 | 10/2007 | Taylor et al. |
| 7,310,777 B2 | 12/2007 | Cirne |
| 7,310,780 B2 | 12/2007 | Diering et al. |
| 7,350,107 B2 | 3/2008 | Thaler et al. |
| 7,505,953 B2 | 3/2009 | Doshi |
| 7,509,632 B2 | 3/2009 | Boger |
| 7,558,847 B2 | 7/2009 | Strassner |
| 7,590,715 B1 | 9/2009 | Raanan |
| 7,607,169 B1 | 10/2009 | Njemanze et al. |
| 7,668,953 B1 | 2/2010 | Sinclair et al. |
| 7,681,182 B1 | 3/2010 | Mistry et al. |
| 7,904,892 B2 | 3/2011 | Babb, II et al. |
| 8,135,739 B2 | 3/2012 | Karidi et al. |
| 8,516,301 B2 | 8/2013 | Beck et al. |
| 8,688,729 B2 | 4/2014 | Gagliardi et al. |
| 2002/0062237 A1 | 5/2002 | Matsumoto et al. |
| 2002/0173997 A1 | 11/2002 | Menard et al. |

(Continued)

OTHER PUBLICATIONS

Response to Office Action dated Sep. 21, 2012, European Patent Application No. 11250805.6.

(Continued)

*Primary Examiner* — Philip Wang
(74) *Attorney, Agent, or Firm* — Vierra Magen Marcus LLP

(57) ABSTRACT

A method for diagnosing problems in a computer system by visualizing flows through applications and other subsystems in a directed graph on a user interface. The user interface represents multiple instances of each application or other subsystem by a respective node, and edges indicate which nodes depend on one another. Aggregate metrics which are based on the multiple instances, and associated alerts, can be provided for the nodes and edges. An aging process can indicate which nodes have not been recently invoked. The user interface can also indicate which nodes and edges are associated with a given business transaction. In a summary view, a node hides the identity of invoked components such as servlets of the application, while in a detailed view these details are provided.

24 Claims, 27 Drawing Sheets

(56) References Cited

U.S. PATENT DOCUMENTS

| | | | |
|---|---|---|---|
| 2003/0056199 | A1 | 3/2003 | Li et al. |
| 2003/0084018 | A1 | 5/2003 | Chintalapati et al. |
| 2004/0039728 | A1 | 2/2004 | Fenlon et al. |
| 2004/0064543 | A1 | 4/2004 | Ashutosh et al. |
| 2004/0075690 | A1 | 4/2004 | Cirne |
| 2004/0078691 | A1 | 4/2004 | Cirne et al. |
| 2005/0120273 | A1 | 6/2005 | Hudson et al. |
| 2005/0131927 | A1 | 6/2005 | Fildebrandt et al. |
| 2005/0210454 | A1 | 9/2005 | DeWitt, Jr. et al. |
| 2006/0004802 | A1 | 1/2006 | Phillips et al. |
| 2006/0036726 | A1 | 2/2006 | Fabbio et al. |
| 2006/0129652 | A1 | 6/2006 | Petrovskaya |
| 2006/0241949 | A1* | 10/2006 | Tobias et al. ............... 705/1 |
| 2007/0043861 | A1 | 2/2007 | Baron et al. |
| 2007/0263541 | A1 | 11/2007 | Cobb et al. |
| 2007/0266149 | A1 | 11/2007 | Cobb et al. |
| 2007/0288633 | A1 | 12/2007 | Mullarkey |
| 2008/0059625 | A1 | 3/2008 | Barnett et al. |
| 2008/0270838 | A1* | 10/2008 | Dorai et al. ............... 714/38 |
| 2009/0019428 | A1 | 1/2009 | Li et al. |
| 2009/0028053 | A1 | 1/2009 | Kannan et al. |
| 2009/0094074 | A1 | 4/2009 | Nikovski et al. |
| 2009/0112667 | A1 | 4/2009 | Blackwell et al. |
| 2009/0132936 | A1* | 5/2009 | Anderson et al. ......... 715/762 |
| 2009/0144305 | A1 | 6/2009 | Little |
| 2009/0177509 | A1 | 7/2009 | David et al. |
| 2010/0063785 | A1 | 3/2010 | Pich et al. |
| 2010/0145945 | A1 | 6/2010 | Episale et al. |
| 2010/0153069 | A1* | 6/2010 | Giese et al. ............... 702/186 |
| 2010/0169331 | A1 | 7/2010 | Karidi et al. |
| 2010/0275054 | A1 | 10/2010 | Grace et al. |
| 2011/0154004 | A1* | 6/2011 | Fischer ............... 713/1 |
| 2012/0072887 | A1* | 3/2012 | Basak ............... 717/123 |
| 2012/0259793 | A1 | 10/2012 | Umansky et al. |
| 2012/0260135 | A1 | 10/2012 | Beck et al. |
| 2012/0260236 | A1 | 10/2012 | Basak et al. |

OTHER PUBLICATIONS

Extended European Search Report dated Sep. 24, 2012, European Patent Application No. 12163427.3.
Non-final Office Action dated Oct. 18, 2012, U.S. Appl. No. 13/082,737, filed Apr. 8, 2011.
Non-final Office Action dated Oct. 22, 2012, U.S. Appl. No. 13/082,723, filed Apr. 8, 2011.
Response to Office Action dated Feb. 20, 2013, U.S. Appl. No. 12/885,135, filed Sep. 17, 2010.
Notice of Allowance and Fee(s) Due dated Feb. 27, 2013, U.S. Appl. No. 13/082,737, filed Apr. 8, 2011.
Final Office Action dated Mar. 7, 2013, U.S. Appl. No. 13/082,737, filed Apr. 8, 2011.
Response to Extended European Search Report dated Apr. 10, 2013, European Patent Application No. 12163428.1.
Response to Extended European Search Report dated Apr. 10, 2013, European Patent Application No. 12163435.6.
Response to Extended European Search Report dated Apr. 10, 2013, European Patent Application No. 12163454.7.
U.S. Appl. No. 12/885,135, filed Sep. 17, 2010.
Response to Office Action dated May 15, 2013, U.S. Appl. No. 13/082,723, filed Apr. 8, 2011.
Notice of Allowance dated May 22, 2013, U.S. Appl. No. 13/082,723, filed Apr. 8, 2011.
Japanese Office Action dated May 14, 2013, Japanese Patent Application No. 2011-199954.
Extended European Search Report dated Jun. 25, 2012, European Patent Application No. 12163428.1.
Response to Office Action dated Jul. 30, 2013, Japanese Patent Application No. JP2011-199954.
English translation of claim amendments filed in Response to Office Action dated Jul. 30, 2013, Japanese Patent Application No. JP2011-199954.
Extended European Search Report dated Jun. 28, 2012, European Patent Application No. 12163435.6.
Extended European Search Report dated Jul. 16, 2012, European Patent Application No. 12163454.7.
Office Action dated Sep. 24, 2013, Japanese Patent Application No. 2011-199954.
Office Action dated Sep. 18, 2013, European Patent Application No. 12163427.3.
Office Action dated Sep. 19, 2013, European Application No. 12163454.7.
Silberschatz, et al., "Operating System Concepts," 8th Edition, John Wiley & Sons, Jul. 29, 2008, pp. 257-267.
Restriction Requirement dated Oct. 9, 2013, U.S. Appl. No. 13/082,710, filed Apr. 8, 2011.
Response to Restriction Requirement dated Nov. 7, 2013, U.S. Appl. No. 13/082,710, filed Apr. 8, 2011.
Response to Office Action dated Aug. 13, 2013, European Patent Application No. 11250805.6.
Extended European Search Report dated Dec. 19, 2011, European Patent Application No. 11250805.6.
Notice of Allowance and Fee(s) Due dated Mar. 20, 2013, U.S. Appl. No. 12/885,135, filed Sep. 17, 2010.
Non-final Office Action dated Nov. 20, 2012, U.S. Appl. No. 12/885,135, filed Sep. 17, 2010.
Response to Office Action dated Jan. 17, 2013, U.S. Appl. No. 13/082,737, filed Apr. 8, 2011.
Response to Office Action dated Jan. 22, U.S. Appl. No. 13/082,723, filed Apr. 8, 2011.
Response to Office Action dated Jan. 27, 2014, European Patent Application No. 12163427.3.
Response to Office Action dated Jan. 27, 2014, European Patent Application No. 12163454.7.
European Office Action dated Feb. 7, 2014, European Patent Application No. 12163428.1.
European Office Action dated Feb. 7, 2014, European Patent Application No. 12163435.6.
Non-final Office Action dated Apr. 23, 2014, U.S. Appl. No. 13/082,710, filed Apr. 8, 2011.

* cited by examiner

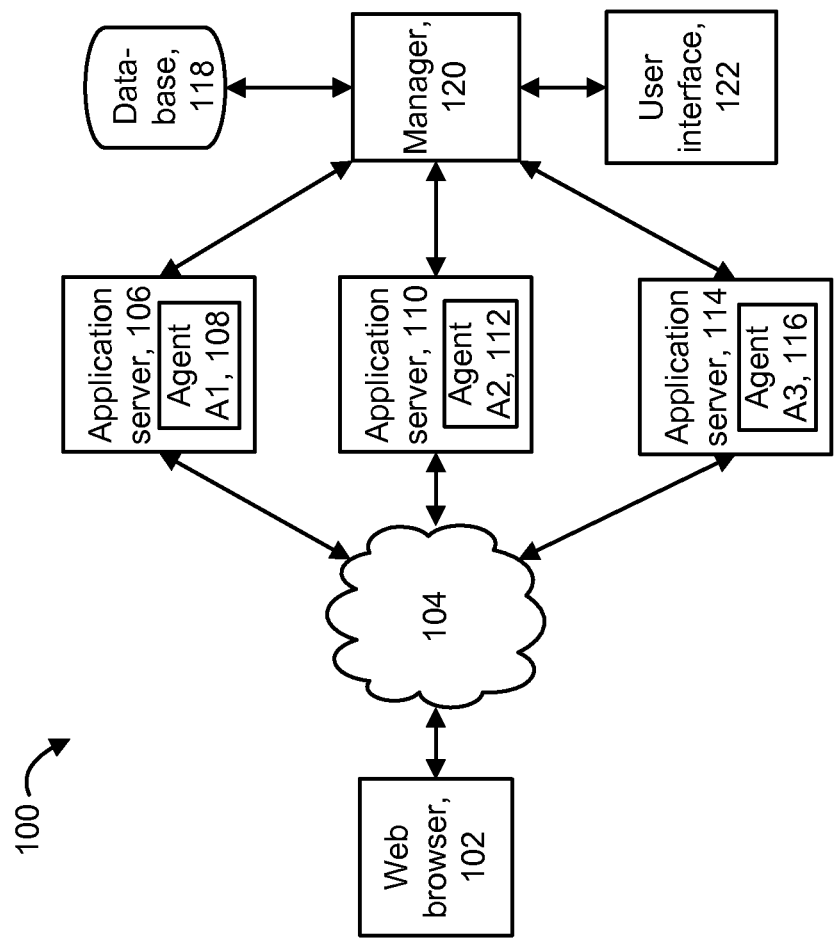

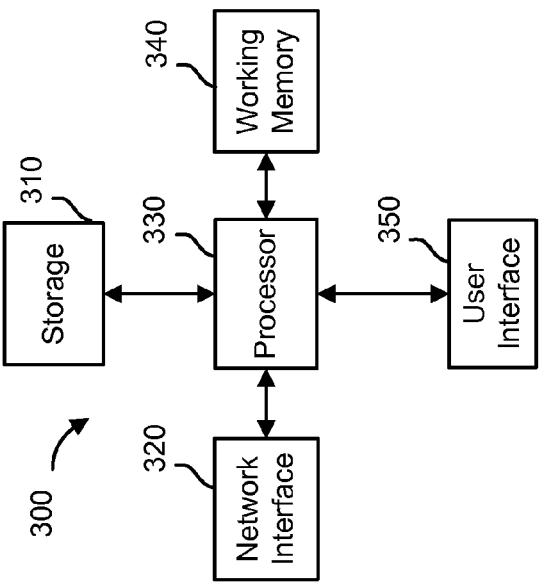
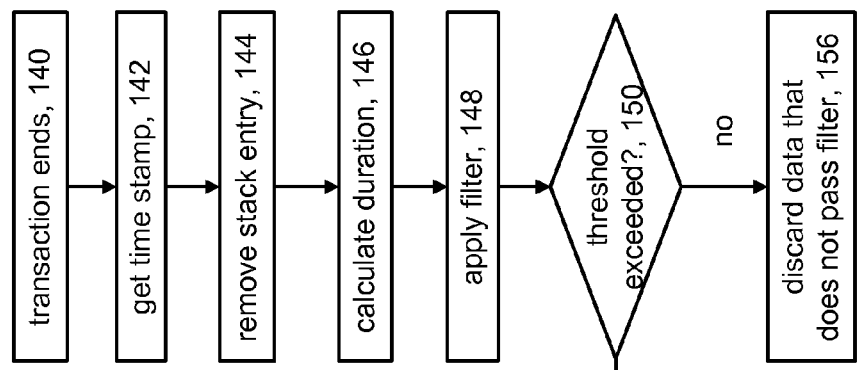
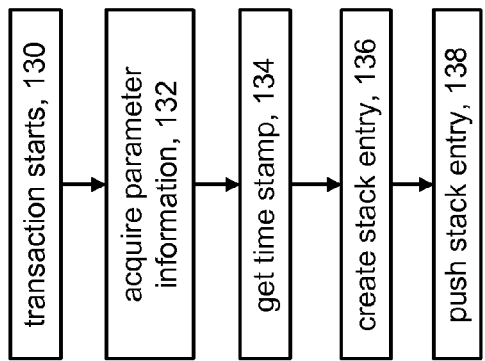

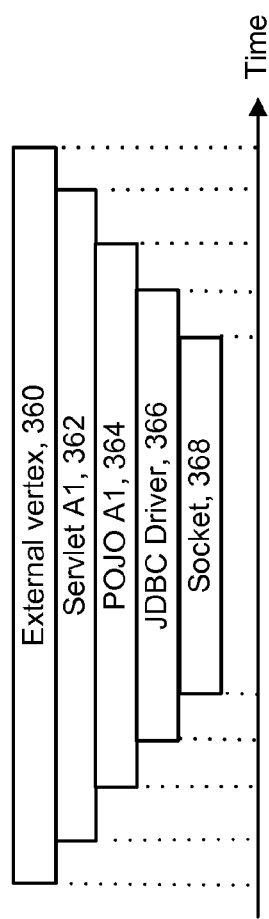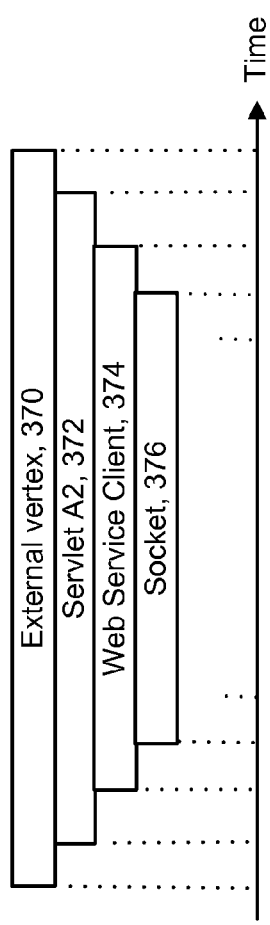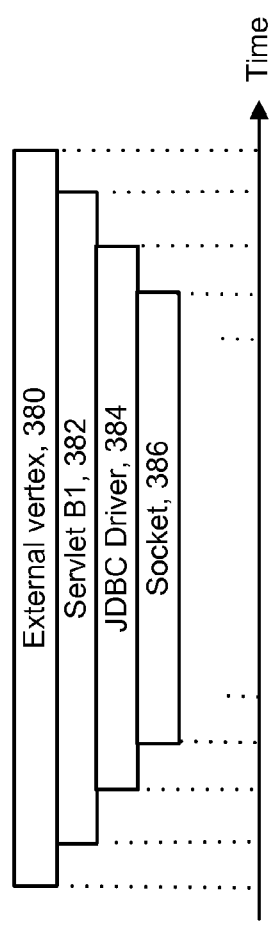

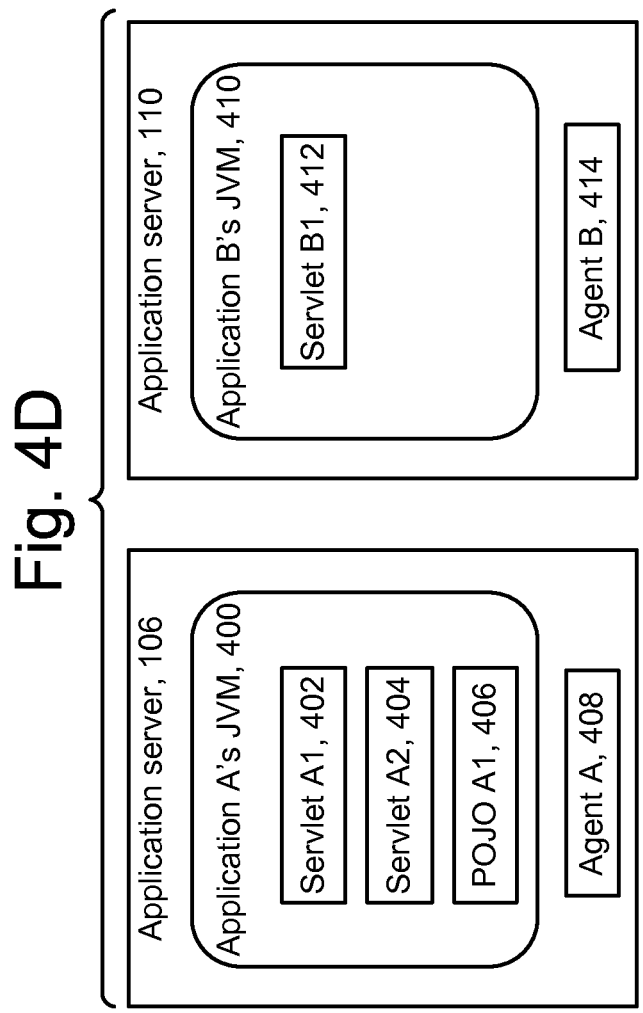

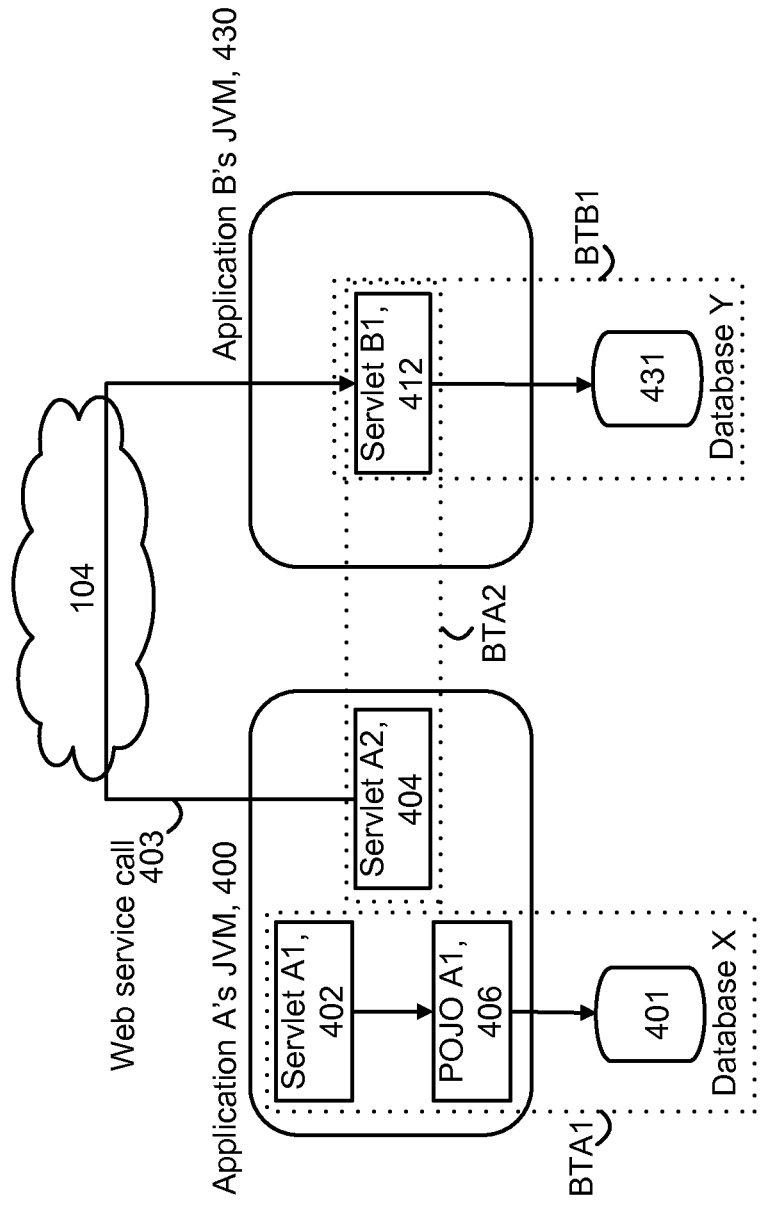

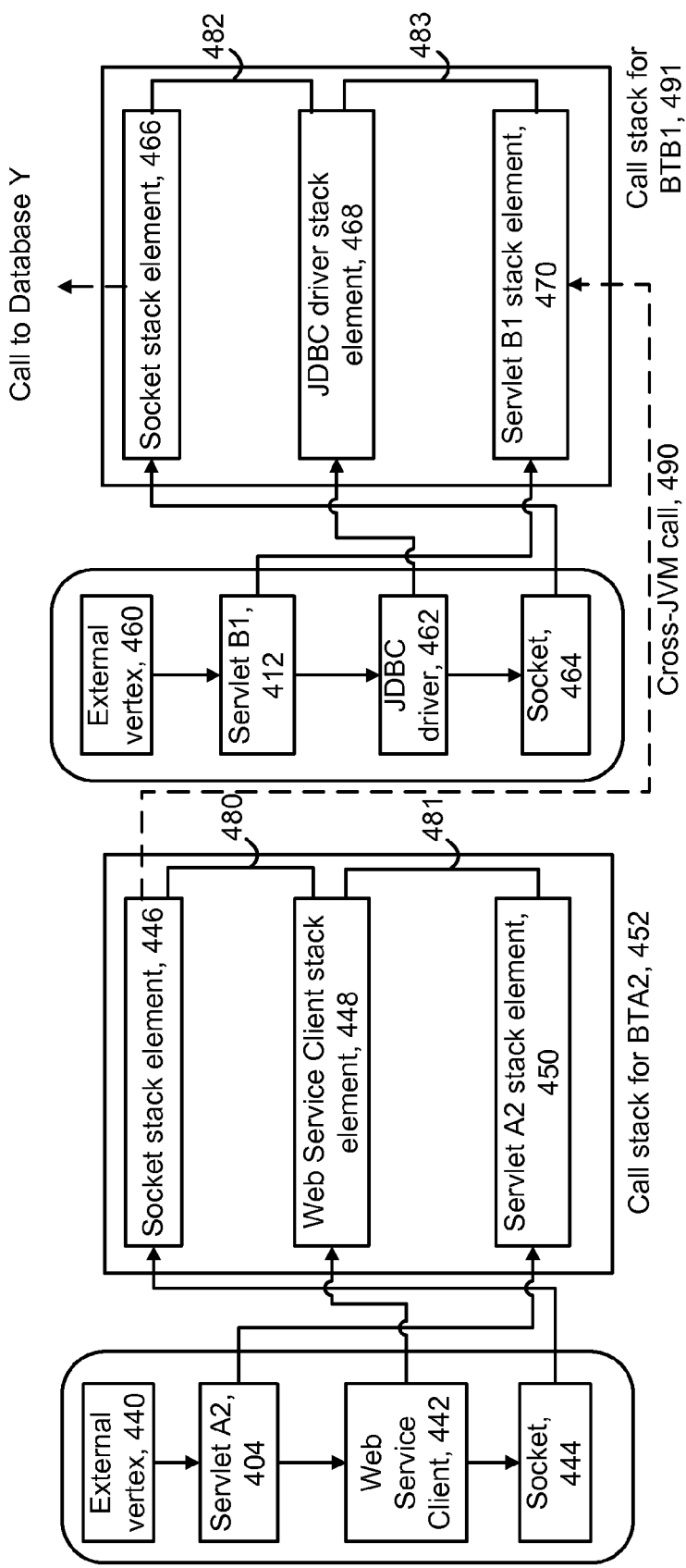

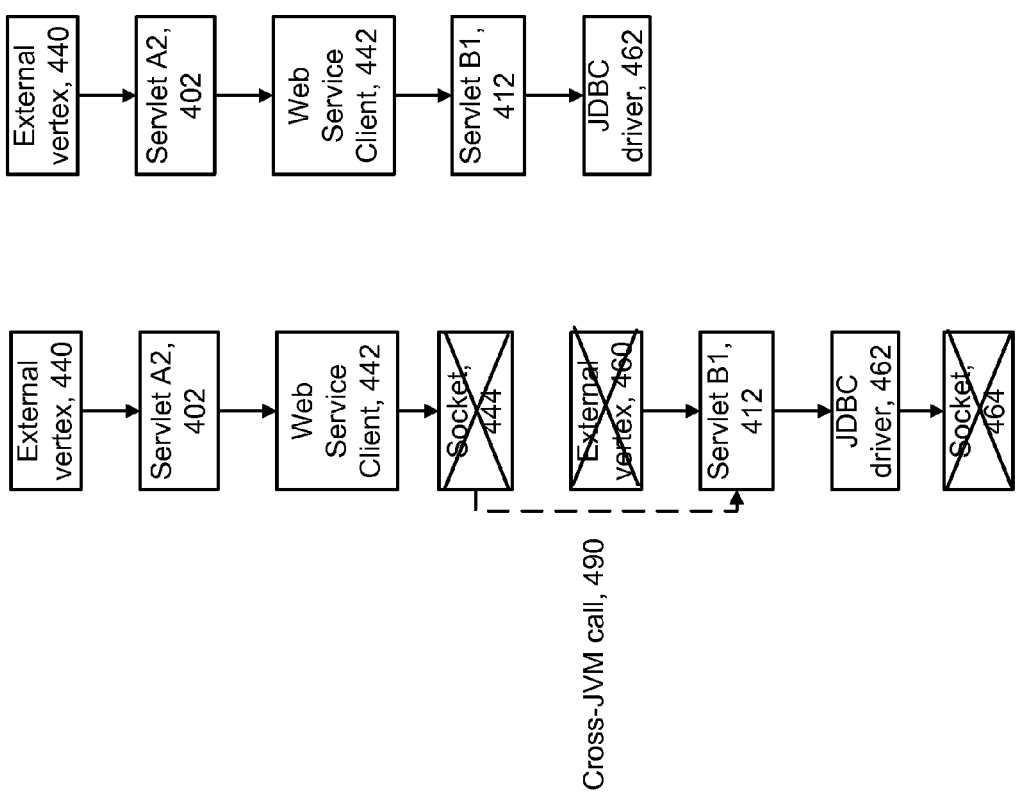

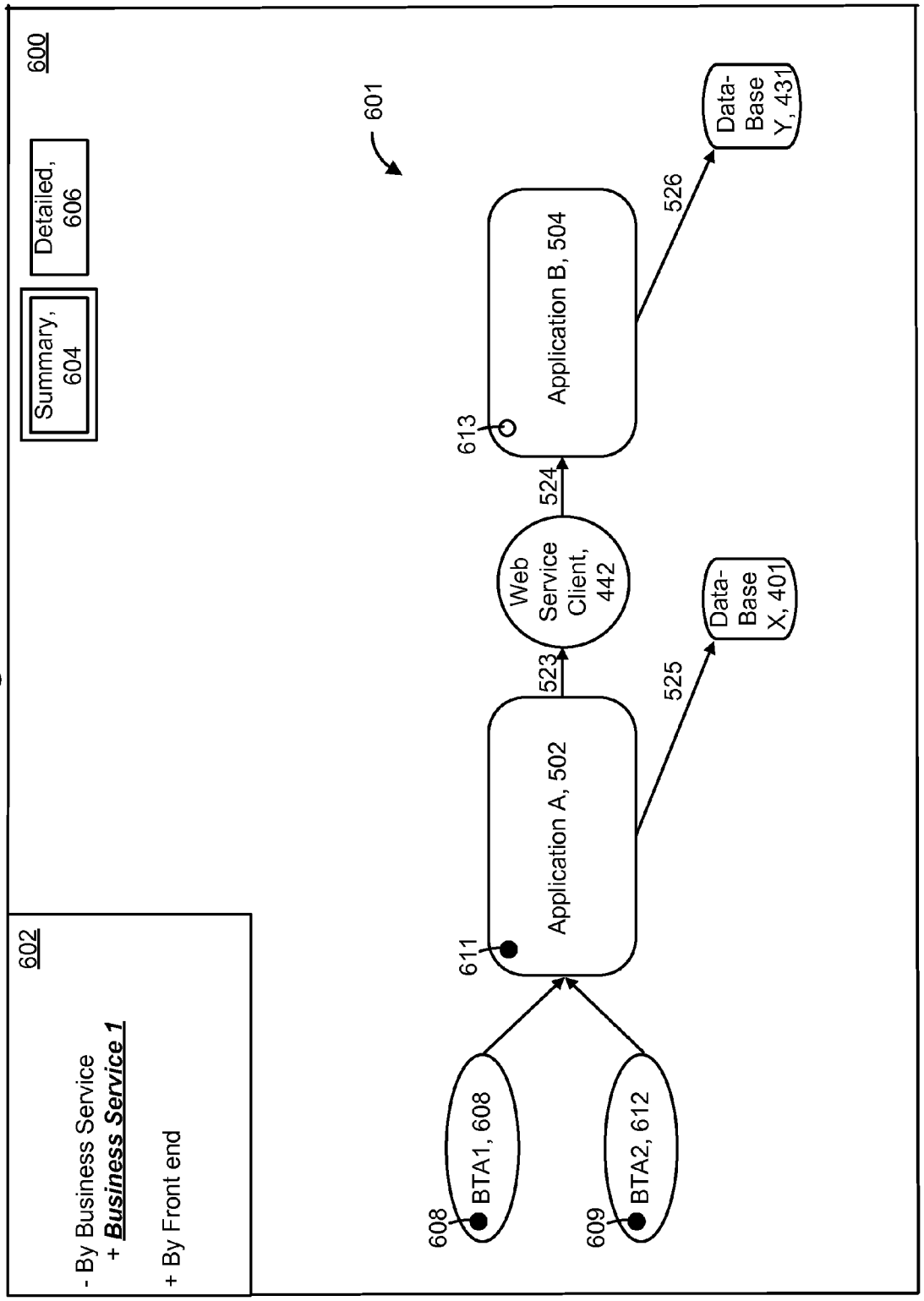

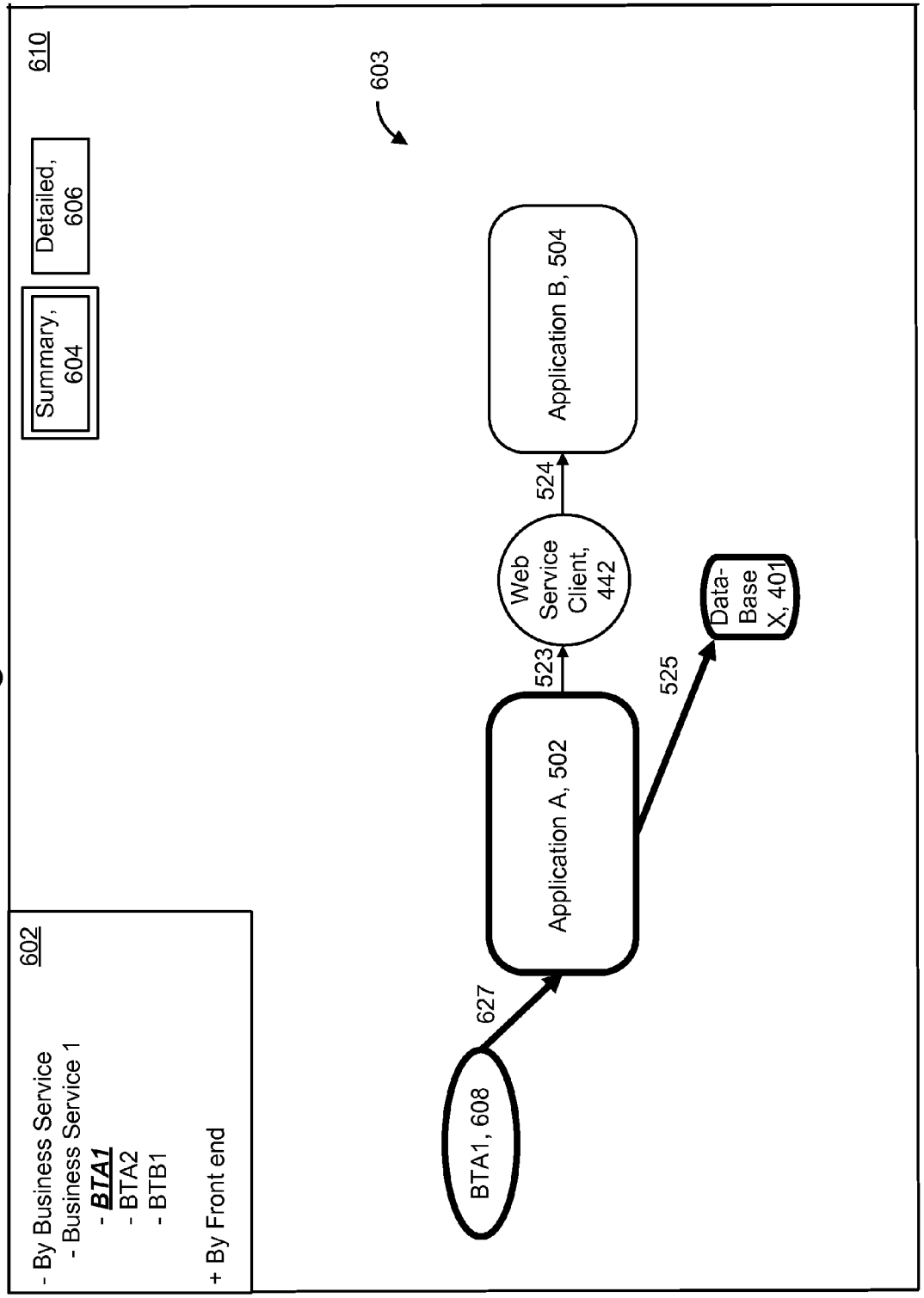

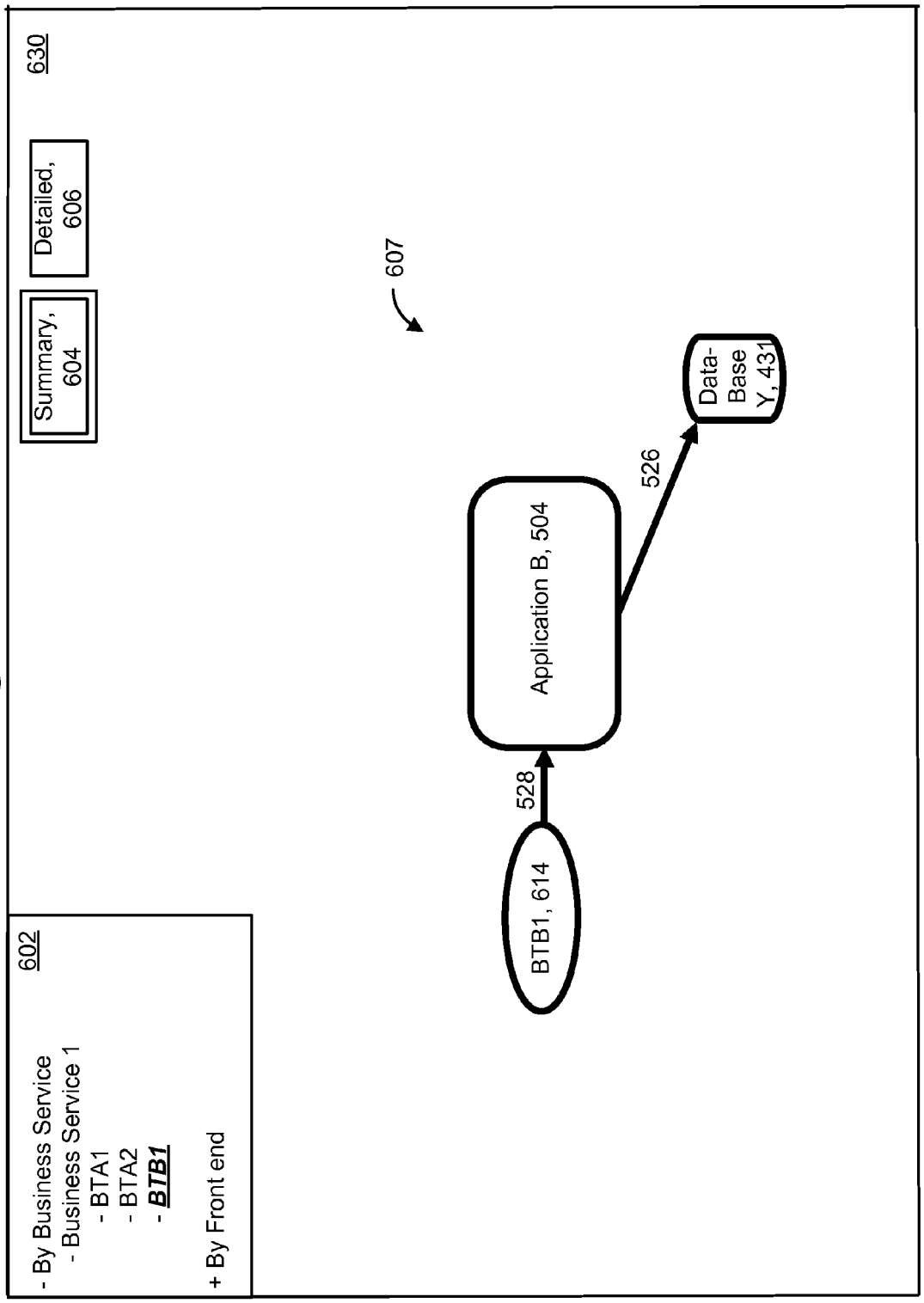

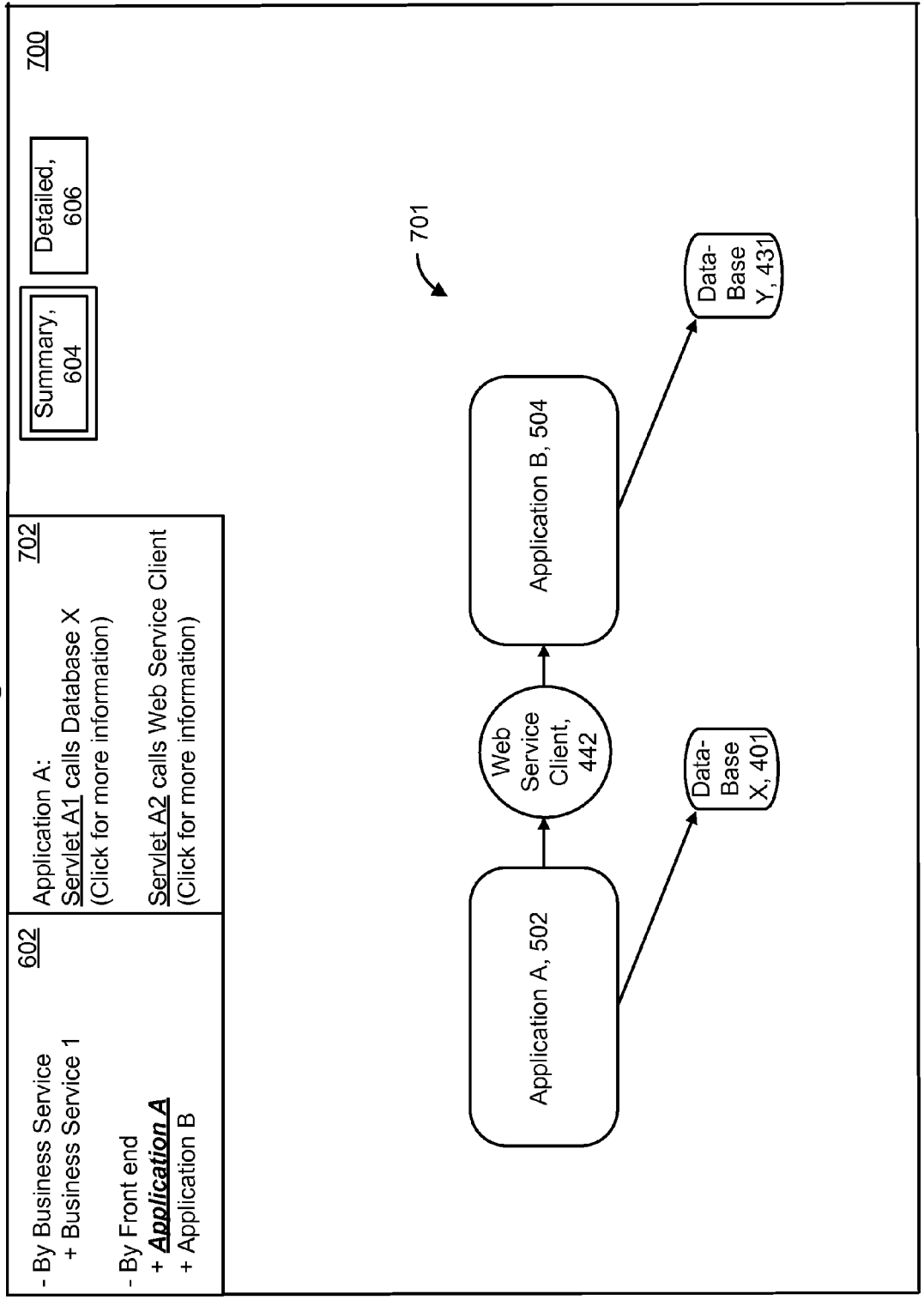
Fig. 7A1

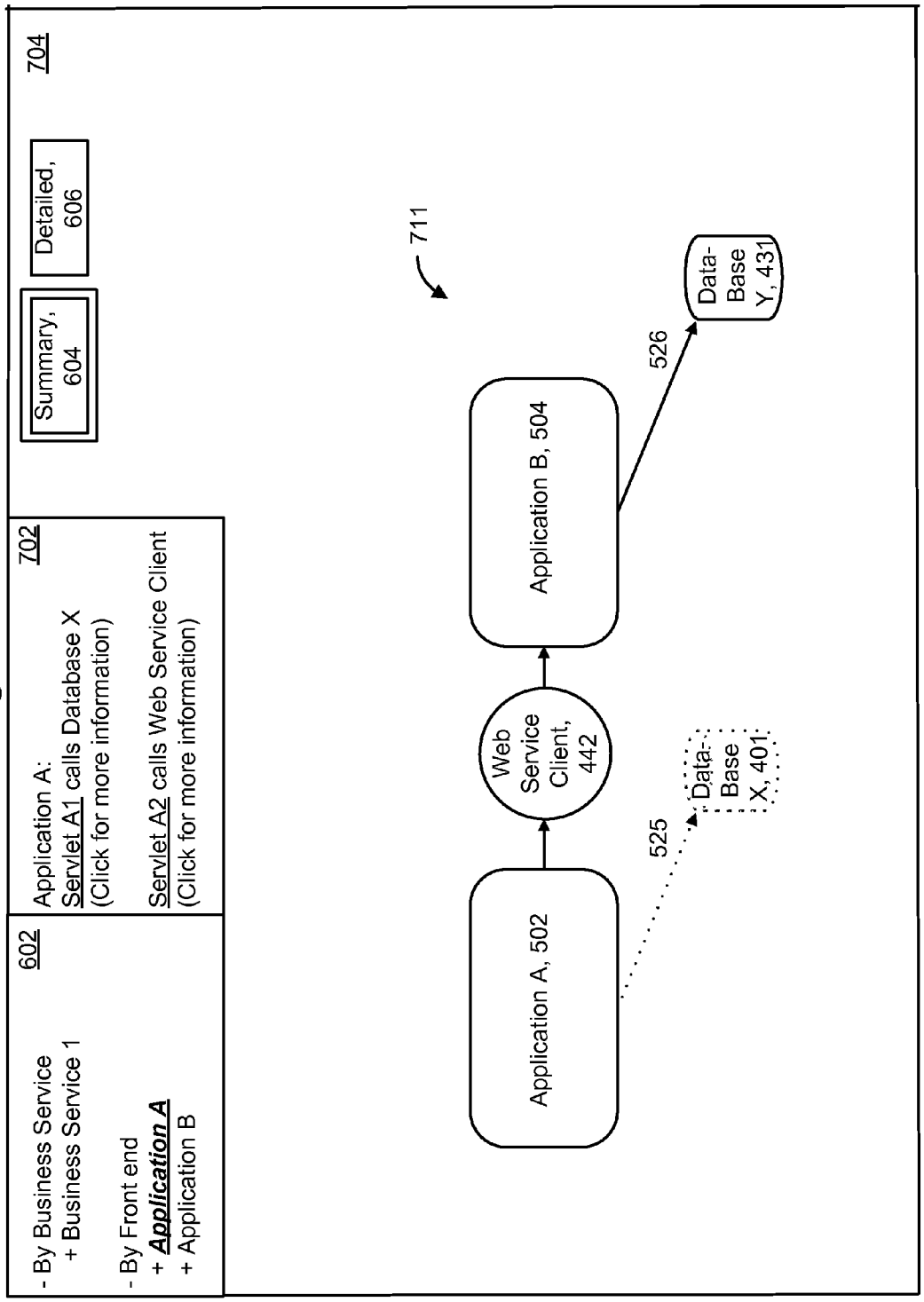
Fig. 7A2

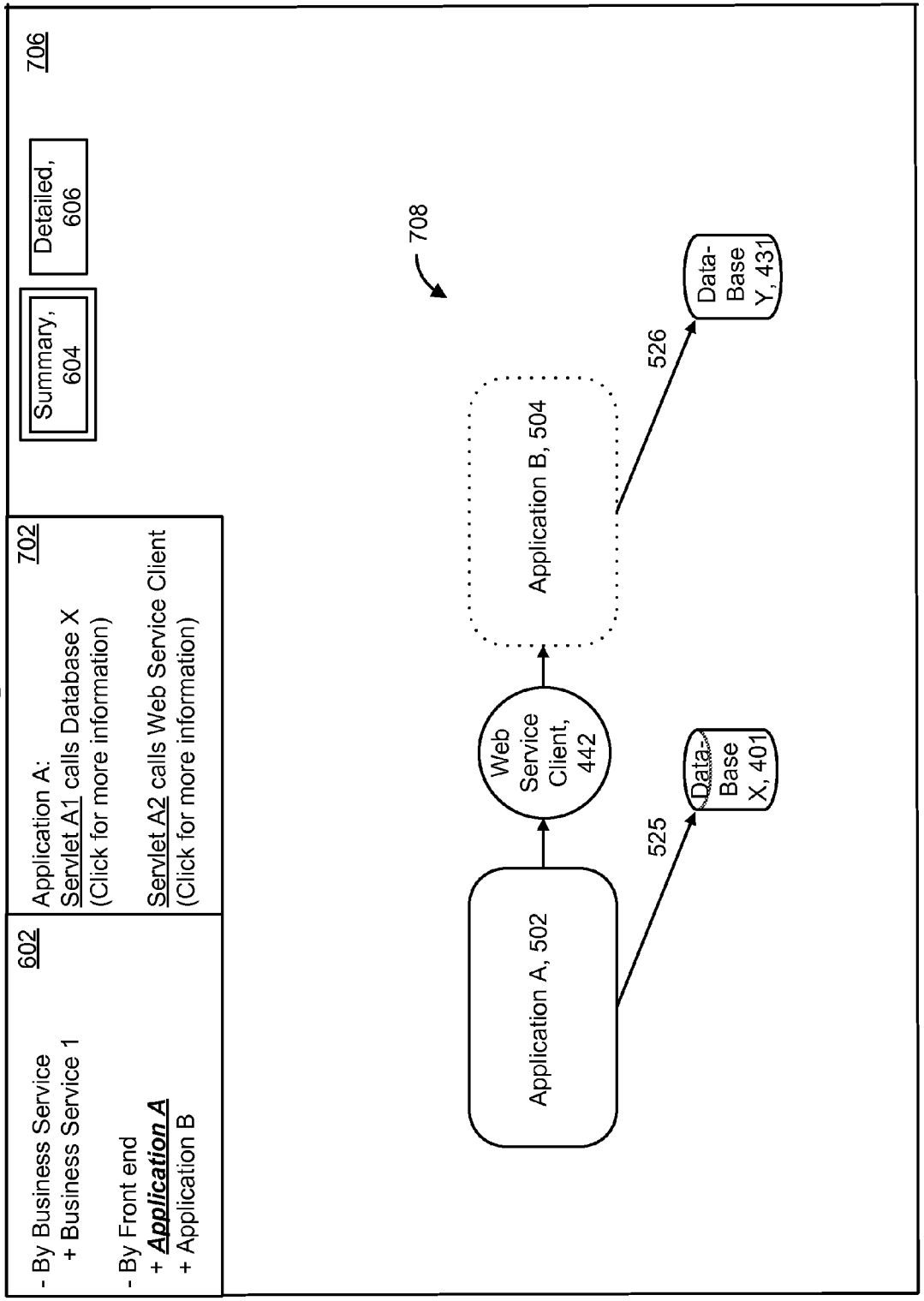
Fig. 7A3

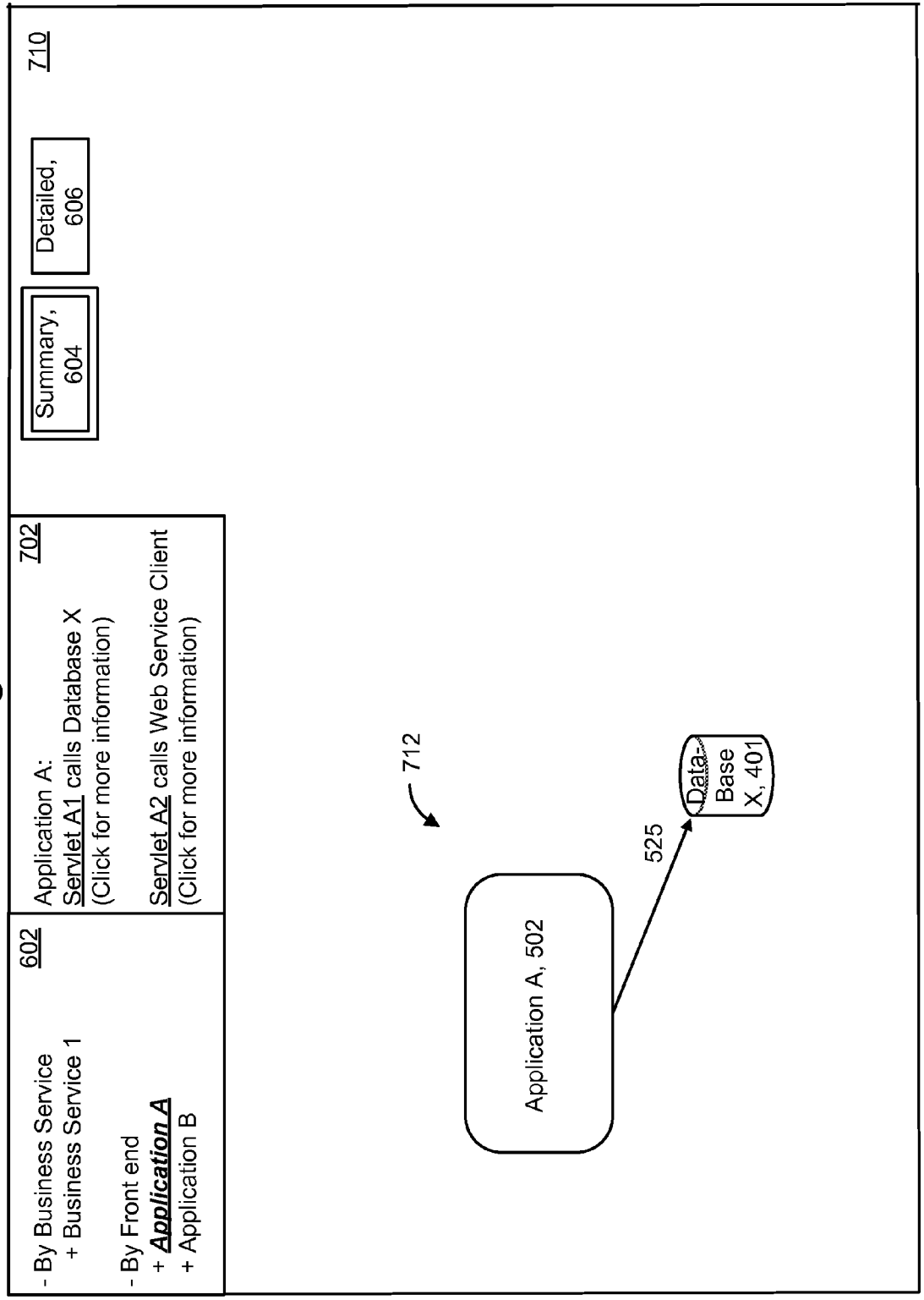
Fig. 7A4

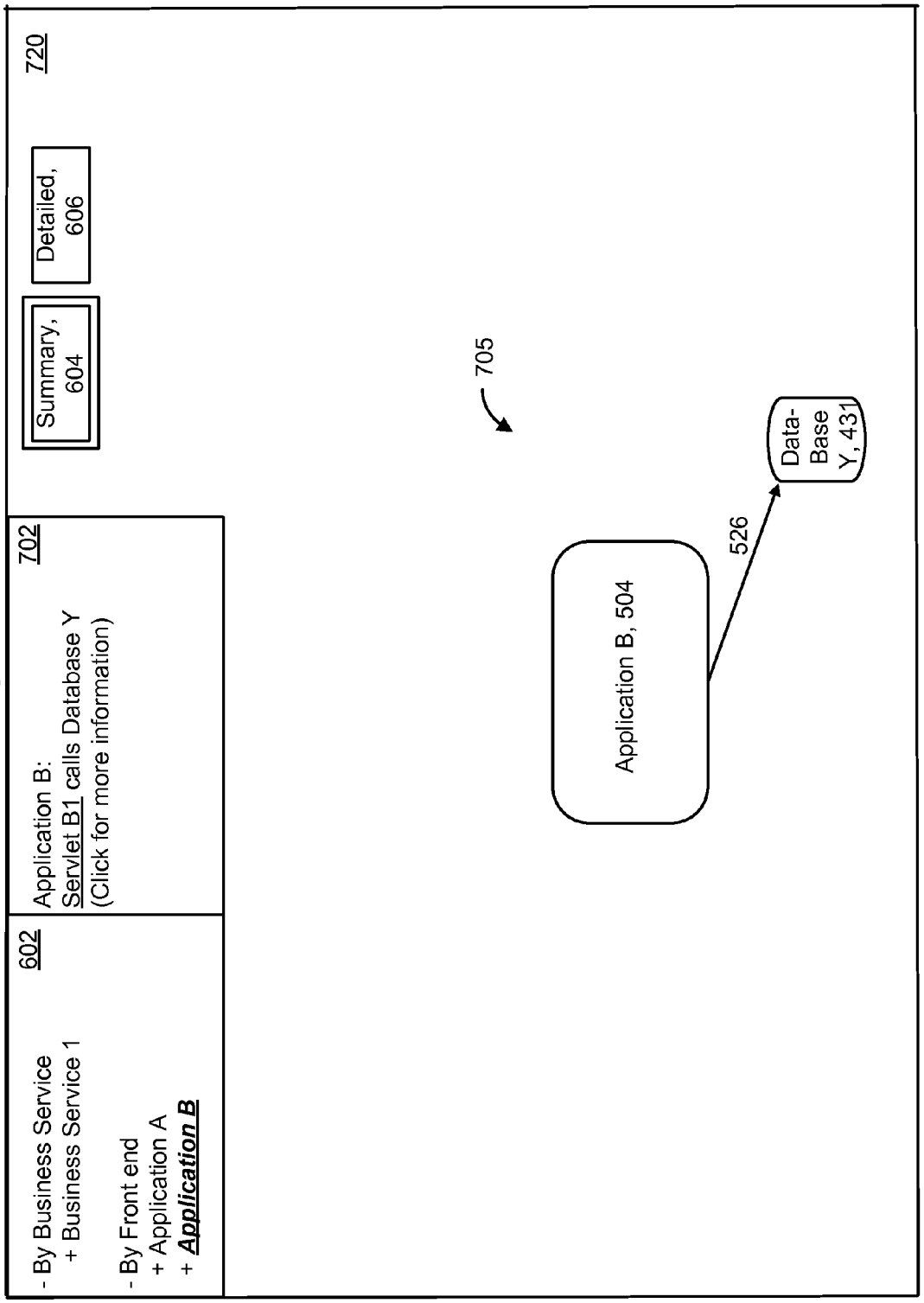

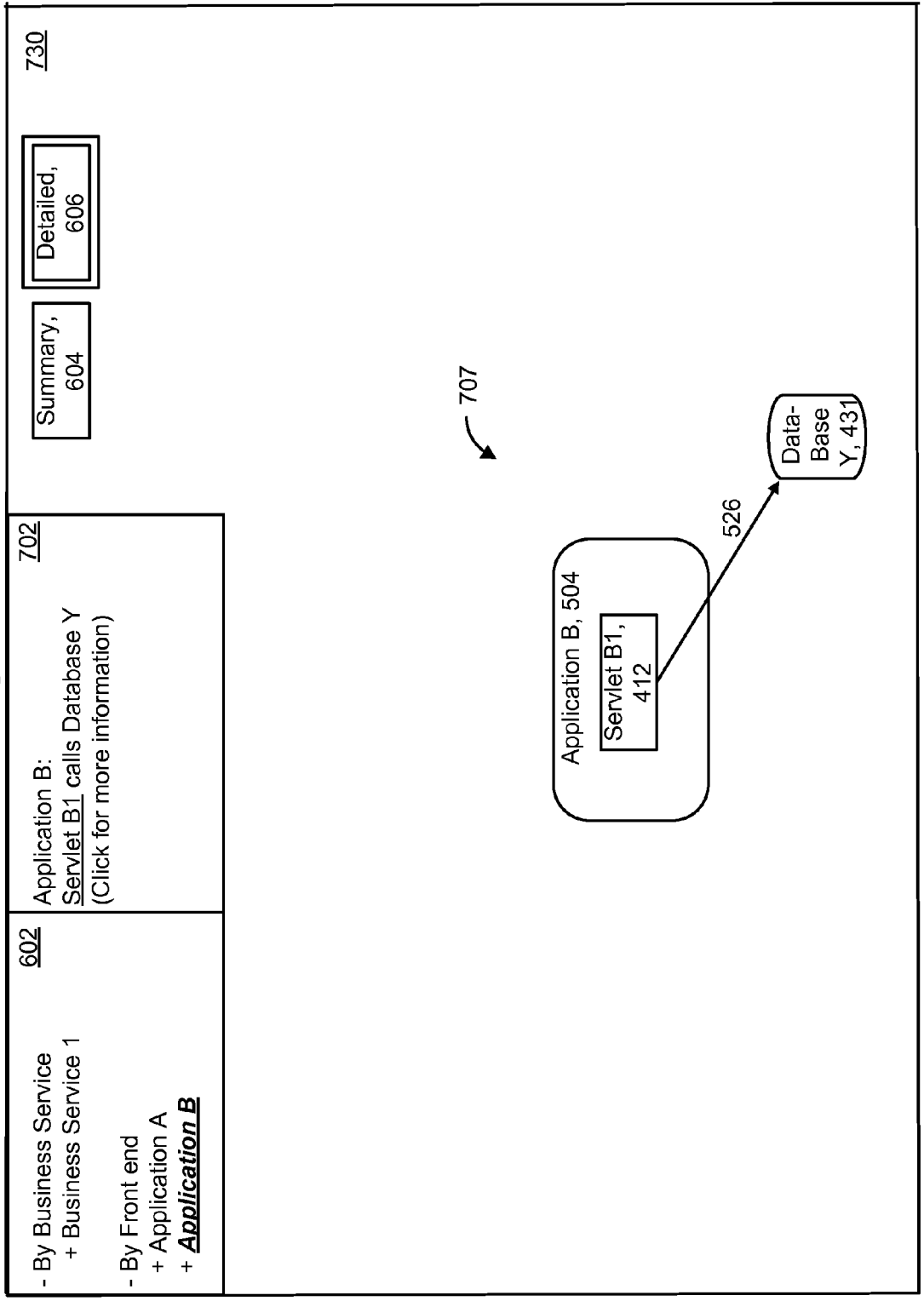

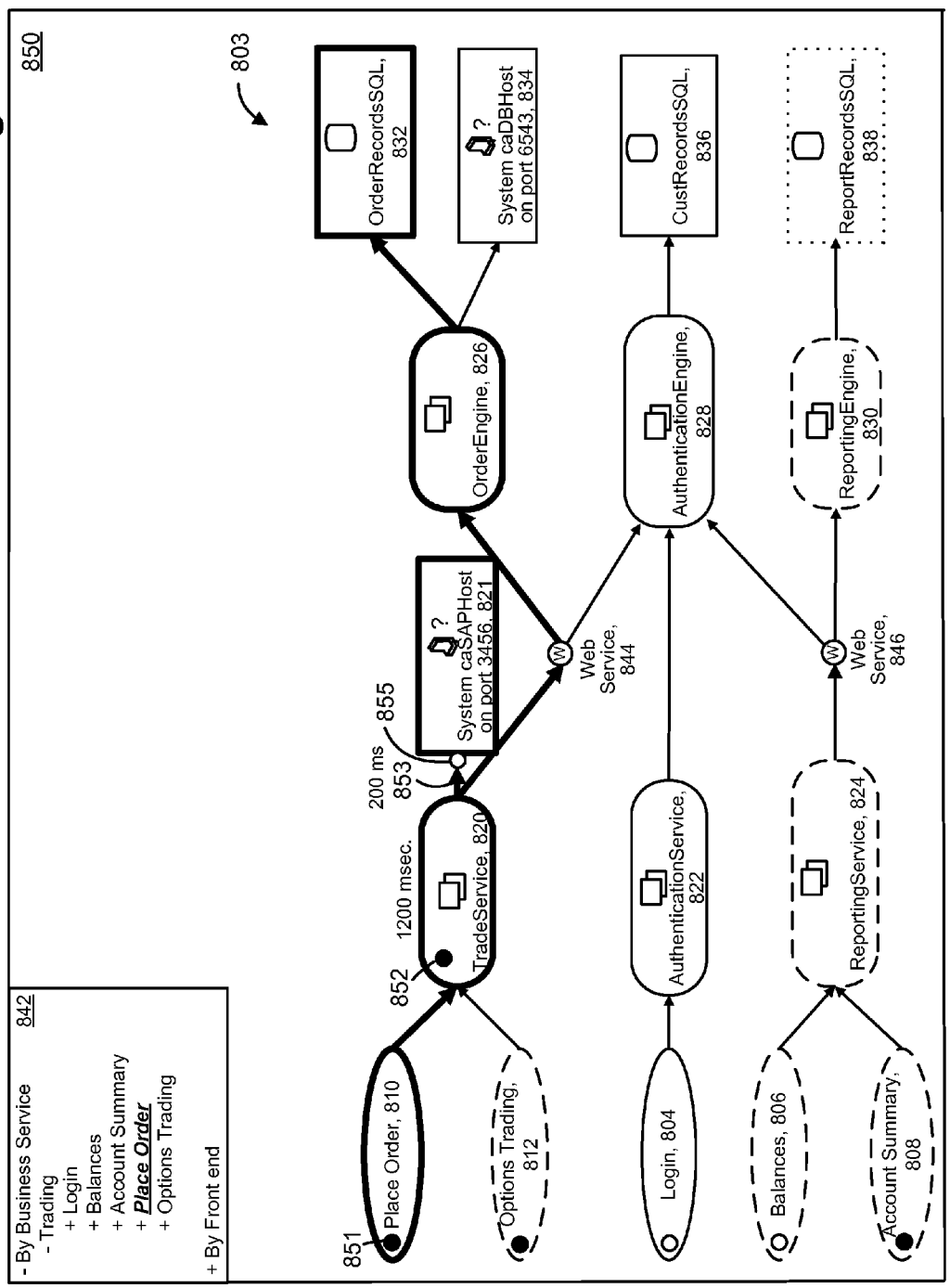

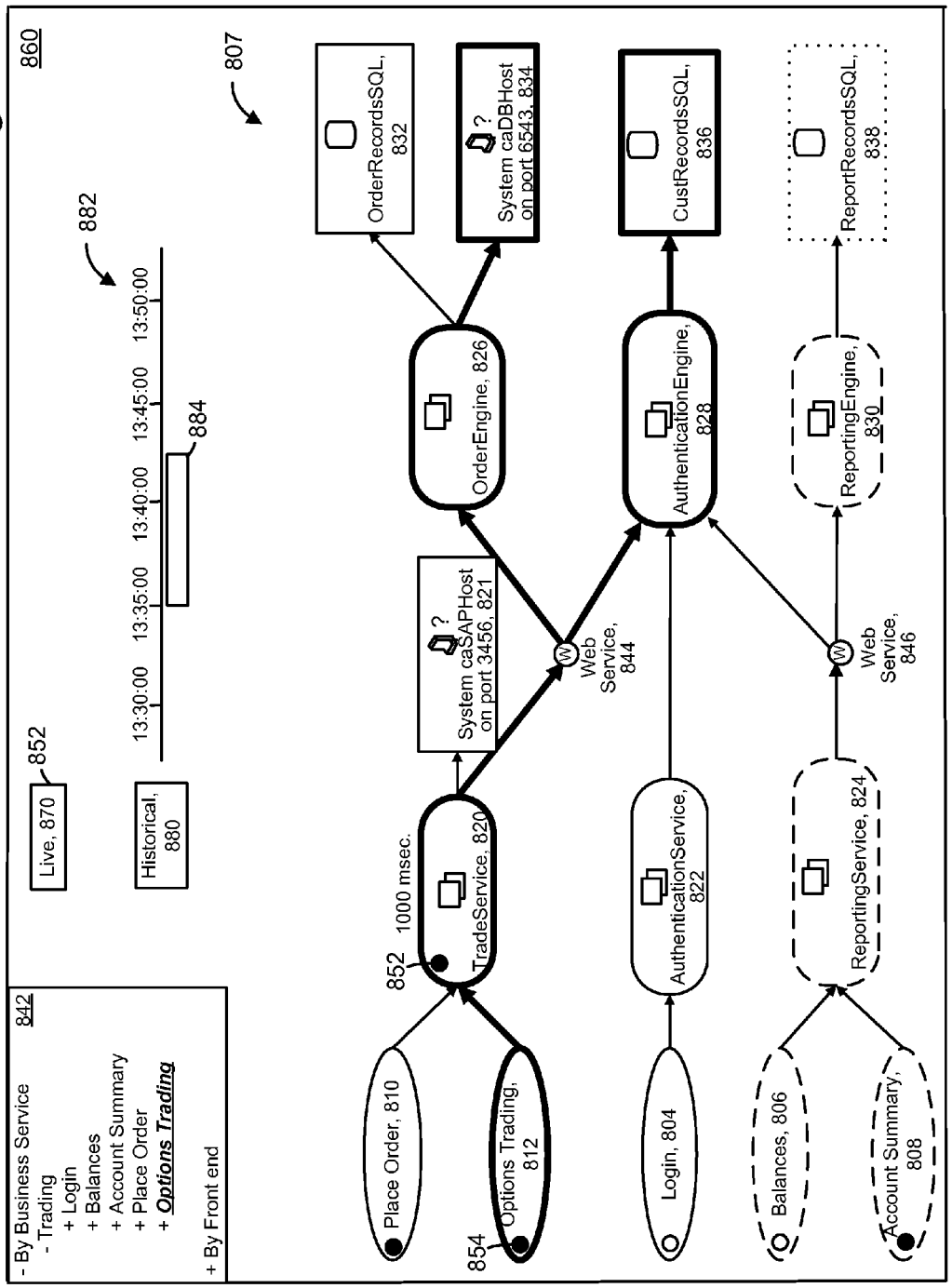

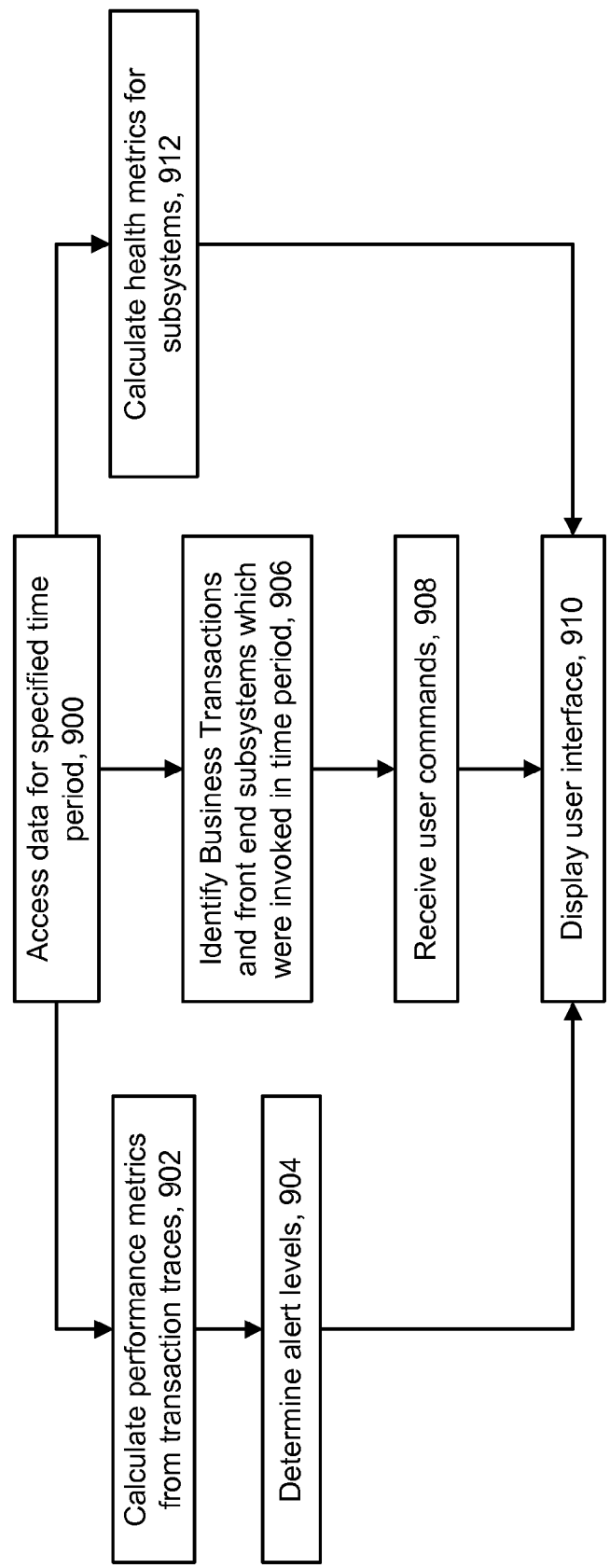

VISUALIZATION OF JVM AND CROSS-JVM CALL STACKS

BACKGROUND OF THE INVENTION

1. Field of the Invention

The present invention is directed to technology for performance monitoring software in a computing environment.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes. One type of trace is a stack trace. Traces can be used as an aid in debugging.

However, diagnosis of problems continues to be difficult and time-consuming. For example, when a transaction or application is failing, the provider wants to know what exactly is going wrong, and why. Improved diagnostic techniques are needed.

SUMMARY OF THE INVENTION

The present invention provides a method for diagnosing performance problems in a computer system by visualizing flows through applications or other subsystems of a computing system.

In one embodiment, tangible, non-transitory computer readable storage having computer readable software embodied thereon is provided for programming at least one processor to perform a method for visualizing flows through at least a first application. The method performed comprises accessing a data store to access data regarding the first application, where the data is obtained from an agent associated with the first application using instrumentation which is installed in the first application, and the data represents multiple instances of the first application. The method performed further includes displaying a dependency graph on a user interface. The dependency graph graphically depicts: (a) a first node which represents the multiple instances of the first application, (b) a second node which represents one subsystem on which the first application depends, and (c) at least one edge which represents a dependency of the first application on the one subsystem.

In another embodiment, tangible, non-transitory computer readable storage having computer readable software embodied thereon is provided for programming at least one processor to perform a method for visualizing flows through respective applications. The method performed includes accessing a data store to access data which is obtained from respective agents associated with the respective applications, where the respective agents provide the data using instrumentation which is installed in the respective applications, and the data represents multiple instances of each of the respective applications. The method performed further includes displaying a dependency graph on a user interface. The dependency graph graphically depicts: (a) a first node which represents multiple instances of one of the respective applications, (b) a second node which represents multiple instances of another of the respective applications, and (c) at least one edge which represents a dependency of the one of the respective applications on the other of the respective applications.

In another embodiment, tangible, non-transitory computer readable storage having computer readable software embodied thereon is provided for programming at least one processor to perform a method for visualizing flows through respective applications. The method performed includes accessing a data store to access data which is obtained from respective agents associated with the respective applications, where the respective agents provide the data using instrumentation which is installed in the respective applications, and the data represents multiple instances of each of the respective applications. The method performed further includes displaying a dependency graph on a user interface. The dependency graph graphically depicts: (a) a first identifier which represents a first business transaction in which the first application is invoked, (b) a node which represents the multiple instances of the first application, (c) a node which represents one subsystem on which the first application depends, in connection with the first business transaction, and (d) at least one edge which represents a dependency of the first application on the one subsystem, in connection with the first business transaction.

Corresponding methods, systems and computer- or processor-readable storage devices which include a storage media encoded with instructions which, when executed, perform the methods provided herein, may be provided.

BRIEF DESCRIPTION OF THE DRAWINGS

FIG. 1 depicts a system which includes a managed application.

FIG. 2A is a flowchart describing one embodiment of a process for starting the tracing of a transaction.

FIG. 2B is a flowchart describing one embodiment of a process for concluding the tracing of a transaction.

FIG. 3 depicts a computing device of the network of FIG. 1.

FIG. 4A depicts a first example transaction trace which involves the application server 106 of FIG. 1.

FIG. 4B depicts a second example transaction trace which involves the application server 106 of FIG. 1.

FIG. 4C depicts a first example transaction trace which involves the application server 110 of FIG. 1.

FIG. 4D depicts an application deployment diagram based on the transaction traces of FIGS. 4A-4C.

FIG. 4E depicts paths in a dependency digraph based on the transaction traces of FIGS. 4A-4C.

FIG. 4I depicts a cross-JVM transaction call stack based on the transaction traces of FIGS. 4B and 4C.

FIGS. 4J and 4K depict pre and post-pruning, respectively, of a dependency digraph for the call stack of FIG. 4I.

FIG. 6A depicts a user interface which provides a summary view of a Business Service, based on the pruned dependency digraphs of FIGS. 4H and 4K.

FIG. 6B depicts the user interface of FIG. 6A after a Business Transaction BTA1 is selected.

FIG. 6D depicts the user interface of FIG. 6A after a Business Transaction BTB1 is selected.

FIG. 7A1 depicts a user interface which provides a summary view based on the pruned dependency digraphs of FIGS. 4H and 4K, where an Application A is selected in a front end view.

FIG. 7A2 depicts an aging process applied to the user interface of FIG. 7A1.

FIG. 7A3 depicts another example of an aging process applied to the user interface of FIG. 7A1.

FIG. 7A4 depicts a further example of an aging process applied to the user interface of FIG. 7A1.

FIG. 7C depicts a user interface which provides a summary view based on the pruned dependency digraph of FIG. 4K, where an Application B is selected in a front end view.

FIG. 7D depicts the user interface of FIG. 7C in a detailed view.

FIG. 8C depicts the user interface of FIG. 8B, where a Business Transaction of Place Order has been selected by the user.

FIG. 8D depicts the user interface of FIG. 8B, where a Business Transaction of Options Trading has been selected by the user.

FIG. 9 depicts a method for providing a user interface.

DETAILED DESCRIPTION

Figure 4H:
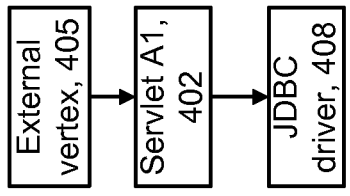
FIGS. 4G and 4H depict pre and post-pruning, respectively, of a dependency digraph for the call stack of FIG. 4F.

The present invention provides a method for diagnosing problems in a computer system by visualizing flows through applications or other subsystems of the computer system.

A tool is provided for monitoring application performance by collecting metrics for applications with the help of respective agents for the applications. The metric data which is collected provides an agent-centric view of all the applications (including multiple instances of the same application) that are being monitored. Further, the tool makes it easier for the business user to interact in business-centric terms by providing a graphical dependency graph, or application graph, which shows the dependency relationship between an application or business process and its logical infrastructure components.

FIG. 1 depicts a network 100 in which different computing devices provide data to a manager. Example computing devices 106, 110 and 114 may include application servers or any other type of computing device having a processor for executing code to achieve a desired functionality. The computing devices can be located remotely from one another or co-located. The computing devices 106, 110 and 114 communicate with a local manager computer 120 in this example. The manager computer 120 could alternatively be remote from the computing devices 106, 110 and 114, in which case communication may occur via the network cloud 104.

For example, a corporation running an enterprise application such as a web-based e-commerce application may employ a number of application servers at one location for load balancing. Requests from users, such as from an example web browser 102 of a user, are received via a network cloud 104 such as the Internet, and can be routed to any of the computing devices 106, 110 and 114. The web browser 102 typically accesses the network cloud 104 via an Internet Service Provider, not shown. Agent software running on the computing devices 106, 110 and 114, denoted by Agent A1 (108), Agent A2 (112) and Agent A3 (116), respectively, gather information from an application, middleware or other software, running on the respective computing devices 106, 110 and 114, in one possible approach. Such information may be obtained using instrumentation, one example of which is byte code instrumentation. However, the gathered data may be obtained in other ways as well. The agents essentially live in the computing device being monitored and provide a data acquisition point. The agents organize and optimize the data communicated to the manager 120. In one implementation, an instance of an Application A executes at the computing device 106 and an instance of an Application B executes at the computing device 110.

The manager 120 can be provided on a separate computing device such as a workstation which communicates with a user interface 122, such as a monitor, to display information based on data received from the agents. The manager can also access a database 118 to store the data received from the agents. In the example provided, the computing devices can communicate with the manager 120 without accessing the network cloud 104. For example, the communication may occur via a local area network. In other designs, the manager 120 can receive data from the agents of a number of computing devices via the network cloud 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 120 and user interface display 122 might be provided at a corporate headquarters location. Other applications which are not necessarily web-based or involve retail or other sales, similarly employ agents and managers for managing their systems. For example, a bank may use an application for processing checks and credit accounts. Moreover, in addition to the multi-computing device arrangements mentioned, a single computing device can be monitored as well with one or more agents.

Various approaches are known for instrumenting software to monitor its execution. For example, as mentioned at the outset, tracing may be used to track the execution of software. One example of tracing is discussed in U.S. Patent Application Publication No. 2004/0078691, titled "Transaction Tracer," published Apr. 22, 2004, incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application. The agent software receives information from the probes and may communicate the information to another process, such as at the manager 120, or process the information locally, such as to determine whether the information indicates an abnormal condition. The agent thus collects and summarizes information received from the probes. The probes collect information as defined by a directives file. For example, the information from the probes may indicate start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents 108, 112 and 116 are typically aware of the software executing on the local computing device 106, 110 and 114, respectively, with which they are associated.

The probes can report a standard set of metrics which include: CORBA method timers, Remote Method Invocation (RMI) method timers, Thread counters, Network bandwidth, JDBC update and query timers, Servlet timers, Java Server Pages (JSP) timers, System logs, File system input and output bandwidth meters, Available and used memory and EJB (Enterprise JavaBean) timers. A metric is a measurement of a specific application activity.

An agent reports information about transactions, which identifies resources which are accessed by an application. In one approach, when reporting about transactions, the word Called designates a resource. This resource is a resource (or a sub-resource) of a parent component, which is a consumer. For example, assume that Servlet A is the first component invoked in a transaction. Under the consumer Servlet A (see below), there may be a sub-resource Called EJB. Consumers and resources can be reported by the agent in a tree-like manner. Data for a transaction can also be stored according to the tree. For example, if a Servlet (e.g. Servlet A) is a consumer of a network socket (e.g. Socket C) and is also a consumer of an EJB (e.g. EJB B), which in turn is a consumer of a JDBC (e.g. JDBC D), the tree might look something like the following:

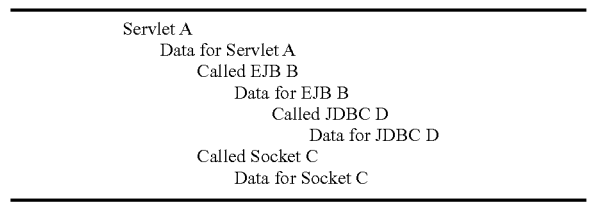

In one embodiment, the above tree is stored by the Agent in a stack, called the Blame Stack. When transactions are started, they are pushed onto the stack. When transactions are completed, they are popped off the stack. In one embodiment, each transaction on the stack has the following information stored: type of transaction, a name used by the system for that transaction, a hash map or dictionary of parameters, a timestamp for when the transaction was pushed onto the stack, and sub-elements. Sub-elements are Blame Stack entries for other components (e.g. methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. As the tree above notes, EJB B is a sub-element of Servlet A and also has its own entry. The top (or initial) entry (e.g., Servlet A) for a transaction, is called the root component. Each of the entries on the stack is an object.

FIG. 2A is a flowchart describing one embodiment of a process for starting the tracing of a transaction. The steps are performed by the appropriate Agent(s). In step 130, a transaction starts. In one embodiment, the process is triggered by the start of a method (e.g., the calling of a "loadTracer" method). In step 132, the Agent acquires the desired parameter information. In one embodiment, a user can configure which parameter information is to be acquired via a configuration file or a UI. The acquired parameters are stored in a hash map or dictionary, which is part of the object pushed onto the Blame Stack. In other embodiments, the identification of parameters is pre-configured. There are many different parameters that can be stored. In one embodiment, the actual list of parameters used is dependent on the application being monitored. The table below provides examples of some parameters that can be acquired.

| Parameters | Appears in | Value |
|---|---|---|
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Blamed Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |
| Object | All non-static methods | toString( ) of the this object of the traced component, truncated to some upper limit of characters. |
| Class Name | All | Fully qualified name of the class of the traced component. |
| Param__n | All objects with WithParams custom tracers | toString( ) of the nth parameter passed to the traced method of the component. |
| Primary Key | Entity Beans | toString( ) of the entity bean's property key, truncated to some upper limit of characters. |

Parameters can include query, cookie, post, URL and session type name/value pairs.

In step 134, the system acquires a timestamp indicating the current time. In step 136, a stack entry is created. In step 138, the stack entry is pushed onto the Blame Stack. In one embodiment, the timestamp is added as part of step 138. The process is performed when a transaction is started. A similar process is performed when a sub-component of the transaction starts (e.g., EJB B is a sub-component of Servlet A—see tree described above).

FIG. 2B is a flowchart describing one embodiment of a process for concluding the tracing of a transaction. The process is performed by an Agent when a transaction ends. In step

140, the process is triggered by a transaction (e.g., method) ending (e.g., calling of a method "finishTrace"). In step 142, the system acquires the current time. In step 144, the stack entry is removed. In step 146, the execution time of the transaction is calculated by comparing the timestamp from step 142 to the timestamp stored in the stack entry. In step 148, the filter for the trace is applied. For example, the filter may include a threshold period of one second. Thus, step 148, would include determining whether the calculated duration from step 146 is greater than one second. If the threshold is not exceeded (step 150), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the Agent to other components in the system of FIG. 1. If the duration exceeds the threshold (step 150), then the Agent builds component data in step 152. Component data is the data about a transaction that will be reported. In one embodiment, the component data includes the name of the transaction, the type of the transaction, the start time of the transaction, the duration of the transaction, a hash map or dictionary of the parameters, and all of the sub-elements (which can be a recursive list of elements). Other information can also be part of the component data. In step 154, the Agent reports the component data by sending the component data via the TCP/IP protocol to Manager 120.

FIG. 2B represents what happens when a transaction finishes. When a sub-component finishes, however, the steps performed include getting a time stamp, removing the stack entry for the sub-component and adding the completed sub-element to previous stack entry. In one embodiment, the filters and decision logic are applied to the start and end of the transaction, rather than to a specific sub-component.

Note, in one embodiment, if the transaction tracer is off, the system will still use the Blame Stack; however, parameters will not be stored and no component data will be created. In some embodiments, the system defaults to starting with the tracing technology off. The tracing only starts after a user requests it, as described above.

FIG. 3 depicts a computing device of the network of FIG. 1. The computing device 300 is a simplified representation of a system which might be used as one of the web browsers, application server, managers and/or user interfaces, such as discussed in connection with FIG. 1. The computing device 300 includes a storage device 310 such as a hard disk or portable media, a network interface 320 for communicating with other computing devices, a processor 330 for executing software instructions, a working memory 340 such as RAM for storing the software instructions after they are loaded from the storage device 310, for instance, and a user interface display 350 such as one or more video monitors. A user interface can be provided one or more monitors. The storage device 310 may be considered to be a tangible, non-transitory processor- or computer-readable storage device having processor readable code embodied thereon for programming the processor 330 to perform methods for providing the functionality discussed herein. The user interface display 350 can provide information to a human operator based on the data received from one or more agents. The user interface display 350 can use any known display scheme, whether graphical, tabular or the like. In addition to an on-screen display, an output such as a hard copy such from a printer can be provided.

The database 118 may be included in the storage device 310 when the storage device 310 is part of a computing device 300 such as an application server, manager and/or user interfaces. The storage device 310 can represent one or more storage devices which store data received from one or more agents, and which can be accessed to obtain data to provide a user interface as described herein. The storage device 310 can represent a data store.

Further, the functionality described herein may be implemented using hardware, software or a combination of both hardware and software. For software, one or more non-transitory, tangible processor readable storage devices having processor readable code embodied thereon for programming one or more processors may be used. The non-transitory, tangible processor readable storage devices can include computer readable media such as volatile and nonvolatile media, removable and non-removable media. For example, non-transitory, tangible computer readable media may include volatile and nonvolatile, removable and non-removable media implemented in any method or technology for storage of information such as computer readable instructions, data structures, program modules or other data. Examples of non-transitory, tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more tangible computer readable media/storage devices, peripherals and/or communication interfaces.

FIG. 4A depicts a first example transaction trace which involves the application server 106 of FIG. 1. A transaction trace of a thread or process can be obtained to identify each component that is invoked, and the calling relationships among the components. This example transaction trace is considered to be part of a business transaction BTA1 (see FIG. 4E). In one approach, the transaction trace is of an application which is considered to be invoked by a first business transaction (BTA1) by virtue of at least a first preselected component such as Servlet A1 of the first application being invoked.

In the transaction trace, the horizontal direction represents time, while the vertical direction indicates call stack depth or position. A transaction trace, also referred to as a call stack, identifies instrumented components which have been called or invoked during the execution of one or more programs, processes or threads. Trace data of instrumented components can be used along with dependency data to understand and debug an application. In particular, a separate transaction trace can be provided for each agent, such that different threads are separated out into different transaction traces.

In a graphical representation which can be provided on a user interface display and/or stored in a data store, an external vertex 360 is the first or root component of the transaction trace. A Servlet A1 362, a Plain Old JAVA™ Object (POJO) A1 364, a Java Database Connectivity (JDBC) driver call 366 and a socket call 368 are at successively lower layers of the transaction trace. A POJO is a JAVA object which is not a special object such as an Enterprise JavaBean (EJB). The external vertex 360 can be any component that calls Servlet A1 in Application A from outside Application A.

FIG. 4B depicts a second example transaction trace which involves the application server 106 of FIG. 1. An external vertex 370 (which can be different than the external vertex 360) is the root component of the transaction trace. A Servlet A2 372, a Web Service Client 374 and a socket call 376 are at successively lower layers of the transaction trace. The external vertex 370 can be any component that calls Servlet A2 in Application A from outside Application A.

FIG. 4C depicts a first example transaction trace which involves the application server 110 of FIG. 1. An external vertex 380 (which can be different than the external vertexes 360 and 370) is the root component of the transaction trace. A Servlet B1 382, a JDBC driver call 384 and a socket call 386 are at successively lower layers of the transaction trace. The external vertex 380 can be any component that calls Servlet B1 in Application B from outside Application B.

The transaction traces of FIGS. 4A-4C provide a basis for the discussion of FIGS. 4D-7E.

FIG. 4D depicts an application deployment diagram based on the transaction traces of FIGS. 4A-4C. Application A is deployed in the application server 106, and Application B is deployed in the application server 110, in this example. The Java Virtual Machine (JVM) 400 of Application A executes Servlet A1 402, Servlet A2 404 and POJO A1 406, while Agent A 408 monitors the execution. In the application server 110, the Java Virtual Machine (JVM) 420 of Application B executes Servlet B1 412, which is exposed as a Web Service, while Agent B 414 monitors the execution.

A dependency graph can be provided based on this example (See FIGS. 5A-7D). A dependency graph displays a dependency relationship (map) between various software components of an application or business transactions as a directed graph (digraph). The software components can be Servlets, EJBs, Databases, message queues (MQs) and so forth.

Specifically, a graph G=(V, E) includes a set V of vertices (also called nodes), and a set E of edges. Each edge represents an ordered pair of vertices. The edges in a directed graph are ordered pairs, i.e., the two vertices the edge connects are ordered. A directed graph edge can be drawn as an arrow pointing from one vertex (source) to another (target). Thus, the head of the arrow is at the target vertex and the tail of the arrow is at the source vertex. Further, a simple path from v1 to vk is a sequence of vertices v1, v2 . . . vk that are connected by edges (v1, v2), (v2, v3) . . . (vk−1, vk). If an application is represented by a directed graph, then a business transaction can be considered as a simple path through that graph. A subgraph S of a graph G is a graph whose vertices and edges are a subsets of vertices and edges of graph G. A subgraph S1 is called edge induced subgraph of G, if it consists of a subset of edges of graph G. A business service can be considered as an edge-induced subgraph of that graph. The logical view of the dependency graph is the union of all physical dependencies between various components across agents. Potentially, an application dependency graph may depict multiple business transactions.

FIG. 4E depicts paths in a dependency digraph based on the transaction traces of FIGS. 4A-4C. In Application A, Servlet A1 402 calls POJO A1 406, which in turn calls Database X 401. Servlet A2 404 makes a Web Service call 403 via the network cloud 104 to Servlet B1 412 of Application B, in response to which Servlet B1 calls Database Y 431. A Business Transaction BTA1 can be defined as the execution flow (series of invoked components/subsystems) from Servlet A1 to POJO A1 to Database X, while a Business Transaction BTA2 can be defined as the flow from Servlet A2 to the Web Service to Servlet B1. Moreover, the transaction BTA2 generates a Business Transaction BTB1 with respect to Application B. BTB1 can be defined as the flow from Servlet B1 to Database Y.

Generally, the agent can track components of every transaction passing through an application/web server. The software components (such as class-method pairs) involved in a transaction are pushed inside a call stack in the order in which they are invoked. A component is popped out of the call stack when a control flow returns to it. However, a transaction call stack includes a number of components which may or may not be of interest to a user. To prevent unnecessarily complex dependency graphs, the agent may only collect dependencies between nodes of interest. A component which is the first interesting element in the call stack or a component that makes a call outside its own JVM (Java Virtual Machine) call can be considered for the dependency graph.

The first component pushed in the call stack may not always be an interesting component. The first interesting component in the call stack is marked as a frontend. A call outside the JVM typically involves a socket. A socket appearing as the last component in a transaction may not always be interesting to the user. We can provide a mechanism for marking any component before the socket call as a component of interest. The interesting component which is before the socket call, closest to the socket call, is marked as a backend. We can provide a few predefined interesting component types, e.g., Servlet, EJB, JDBC/database and so forth in a baseline configuration. A user can extend the interesting types by a tracer extension capability.

Further, in the dependency graph, an edge consists of source and target vertices, and the starting edge is between an external vertex and the front end component. The starting vertex is usually represented either by a cloud or an external component.

Figure 4G:
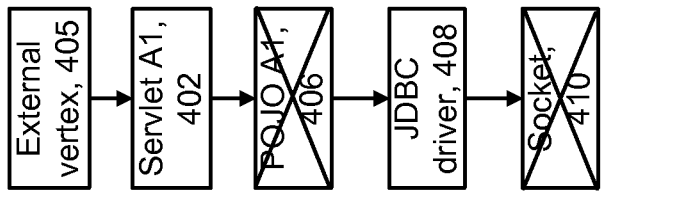
Figure 4F:
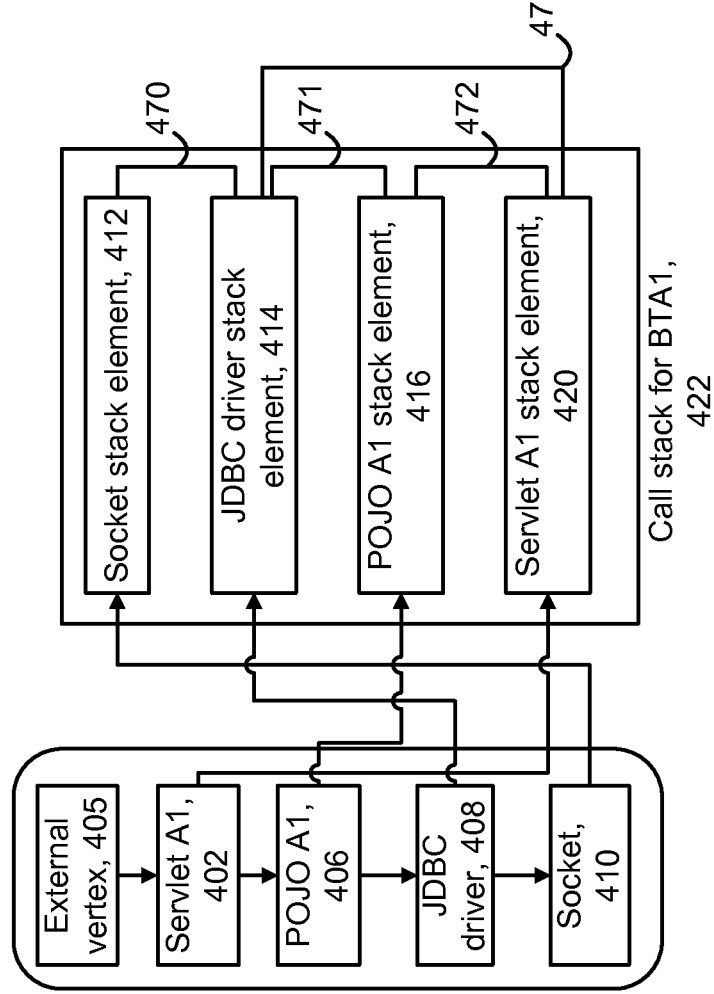
FIG. 4F depicts a single JVM transaction call stack based on the transaction trace of FIG. 4A.

FIG. 4F depicts a single JVM transaction call stack based on the transaction trace of FIG. 4A. BTA1 is an example of a single JVM transaction, which is confined within a calling application's JVM. BTA1 is confined within Application A's JVM. In one possible implementation, the external vertex 405 is provided by an incoming HTTP request, which invokes Servlet A1 402, which in turn calls POJO A1 406. POJO A1 in turn calls Database X. The call to the database is routed through a JDBC driver 408, which is a software component providing database connectivity to JAVA applications. The inter-process communication flow from the JDBC driver 408 to the actual physical database, Database X, passes through a Socket 410.

The call stack for BTA1 422 includes a Servlet A1 stack element 420, a POJO A1 stack element 416, a JDBC driver stack element 414 and a Socket stack element 412. Based on these stack elements, edges between the elements can be defined for use in creating the dependency graph. These include an edge 472 which indicates that Servlet A1 depends on POJO A1, an edge 471 which indicates that POJO A1 depends on the JDBC driver, and an edge 470 which indicates that JDBC driver depends on a socket call.

FIGS. 4G and 4H depict pre and post-pruning, respectively, of a dependency digraph for the call stack of FIG. 4F. As mentioned, some components are not considered to be interesting and can therefore be pruned before preparing the dependency graph. For example, assuming that POJO A1 is not of interest, the edge 472 between Servlet A1 and POJO A1 can be discarded. Instead, an edge 473 is considered to extend between Servlet A1 and the JDBC driver. Similarly, assume the edge 470 between the JDBC driver and the Socket is not treated as being important, due to the JDBC driver being marked as a backend. With this example, the call sequence of FIG. 4G is pruned by removing POJO A1 406 and the socket 410 to obtain the call sequence of FIG. 4H.

FIG. 4I depicts a cross-JVM transaction call stack based on the transaction traces of FIGS. 4B and 4C. A cross-JVM transaction involves multiple JVMs and transaction call stacks. BTA2 is an example of a cross-JVM Business Transaction. In one possible implementation, the external vertex 440 is provided by an incoming HTTP request, which invokes Servlet A2 402, which in turn calls a Web Service Client 442. That is, a Web Service call from Servlet A2 to Servlet B1 412 is routed through an inter-process Socket 444. This call is the cross-JVM call 490. The call stack for BTA2 452 includes a Servlet A2 stack element 450, a Web Service Client stack element 448 and a Socket stack element 446. Based on these stack elements, edges between the elements can be defined for use in creating the dependency graph. These include an edge 481 which indicates that Servlet A2 depends on a Web Service Client, and an edge 480 which indicates that the Web Service Client depends on a socket call.

For BTB1, the external vertex 460 can represent the incoming call from Application A. This invokes Servlet B1 412, which in turn calls a JDBC driver 462. The JDBC driver 462 makes a call to Database Y via socket 464. The call stack for BTB1 491 includes a Servlet B1 stack element 470, a JDBC driver stack element 468 and a Socket stack element 466. Based on these stack elements, edges between the elements can be defined for use in creating the dependency graph. These include an edge 483 which indicates that Servlet B1 depends on a JDBC driver, and an edge 482 which indicates that the JDBC driver depends on a socket call. Note that the database call from Servlet B1 to Database Y is not only part of a single JVM Business Transaction BTB1 but also part of the cross-JVM Business Transaction BTA2. Thus, a given component/subsystem can be part of one or more Business Transactions.

In one example, the edges to the Sockets in both the Business Transactions BTA2 and BTB1 are not considered important due to the appearances of backend markers before the Sockets. In this case, edges 480 and 482 can be pruned, leaving the edges 481 and 483.

FIGS. 4J and 4K depict pre and post-pruning, respectively, of a dependency digraph for the call stack of FIG. 4I. In the above-mentioned example, the call sequence of FIG. 4J is pruned by deleting the Sockets 444 and 464. The external vertex 460 is also pruned since it is essentially replaced by the Web Service Client 442.

Figure 5A:
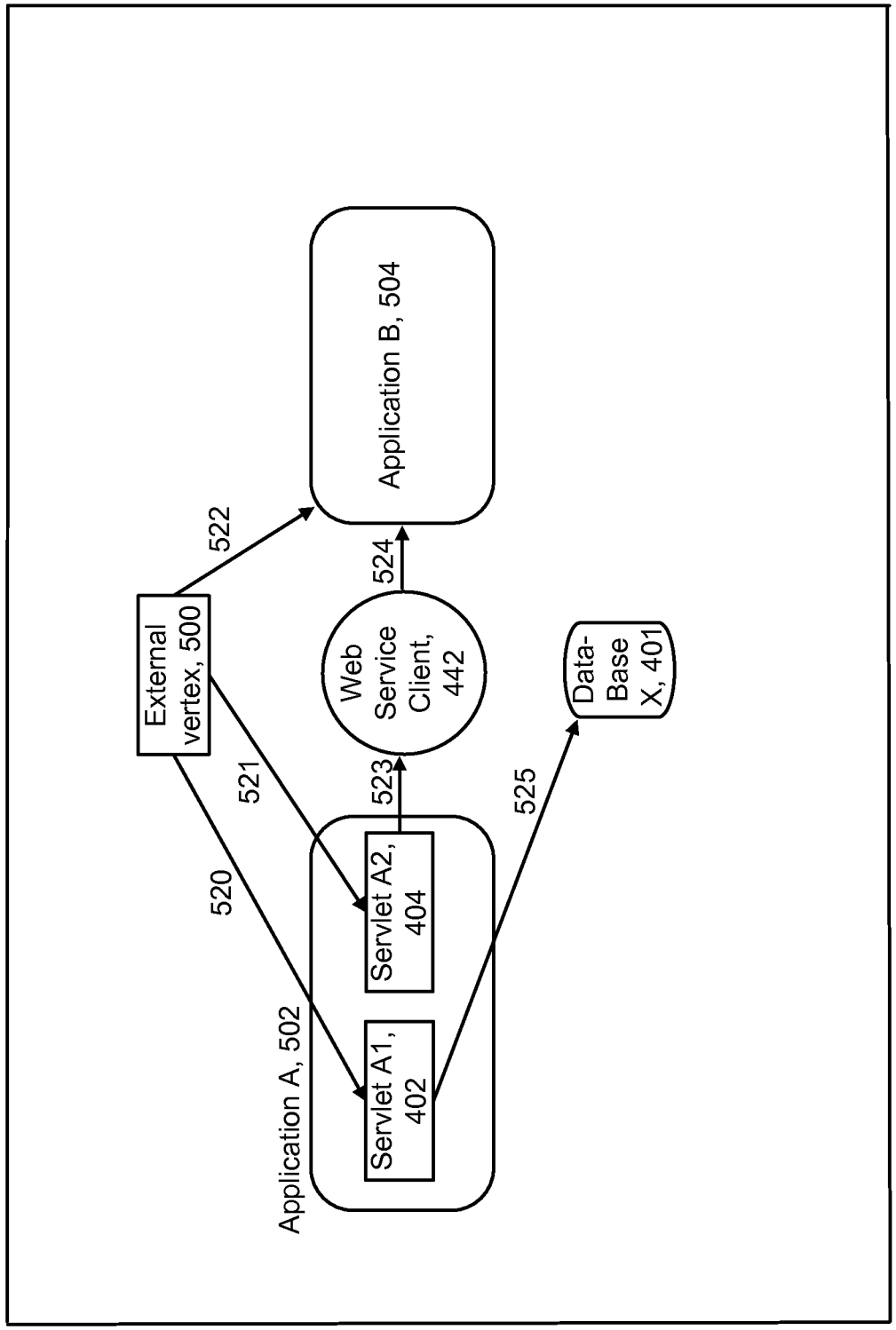
FIG. 5A depicts a dependency graph with details for Application A, based on the pruned dependency digraphs of FIGS. 4H and 4K.

FIG. 5A depicts a dependency graph with details for Application A, based on the pruned dependency digraphs of FIGS. 4H and 4K. The Business Transactions BTA1 and BTA2 are considered part of Application A's dependency graph. BTA1 and BTA2 are combined to form one dependency digraph or map of Application A. The JDBC driver invoked in BTA1 is labeled with the name of the calling physical database, Database X. Since Servlet A1 402 and Servlet A2 404 are front ends for Application A at different instances, they are grouped together inside a vertex or node 502 named Application A.

Figure 5B:
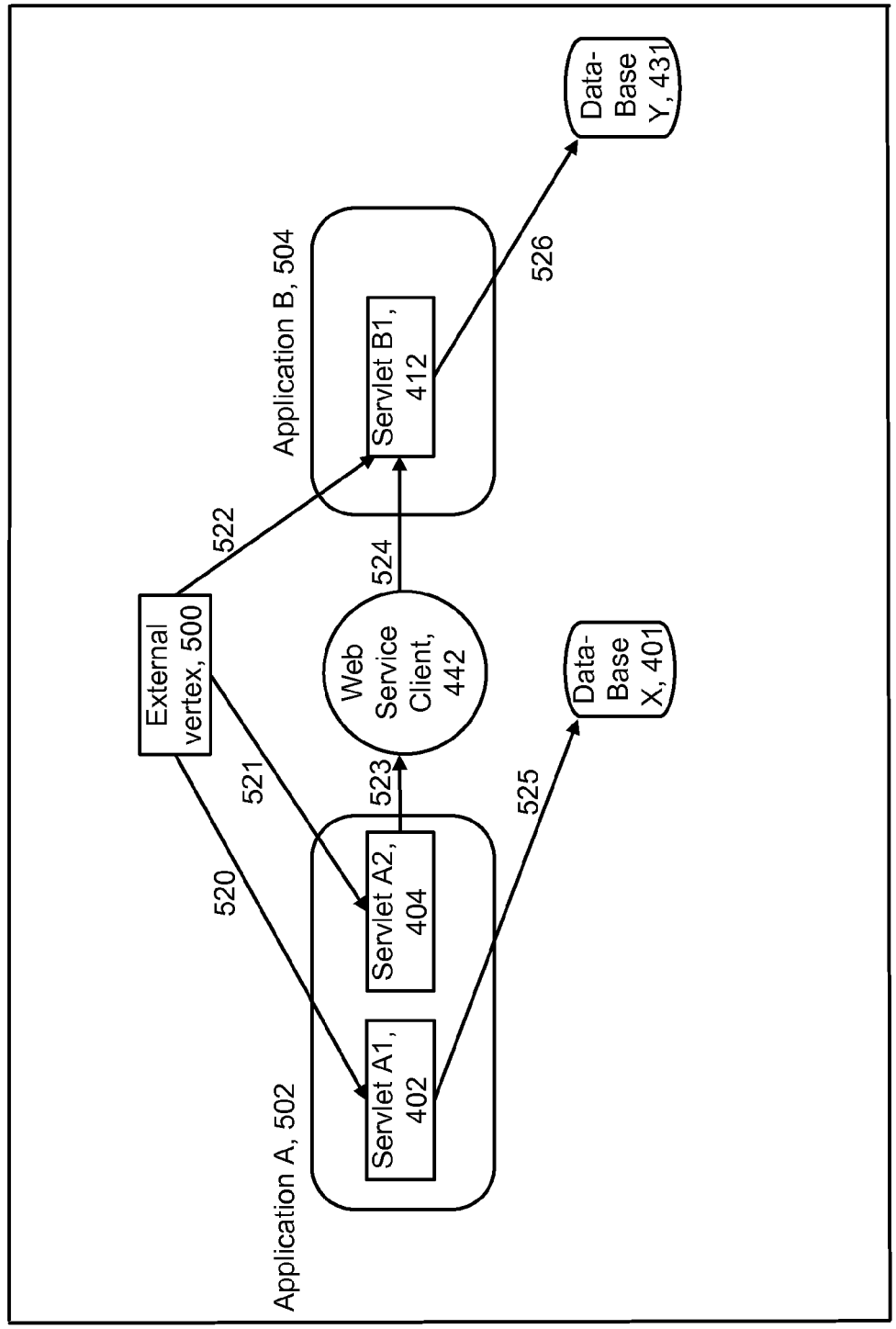
FIG. 5B depicts a dependency graph with details for Application A and Application B, based on the pruned dependency digraphs of FIGS. 4H and 4K.

The detailed dependency graph view of an application shows all its relationships/edges with all the called backends, including any cross-JVM relationship with other applications, such as depicted by the Application B node 504. The edges are also shown, including an edge 525 between Servlet A1 402 and Database X 401, and edge 523 between Servlet A2 404 and Web Service Client 442, and an edge 524 between Web Service Client 442 and Application B 504. The vertices for Servlet B1 and Database Y and the edges between Servlet B1 and Database Y are not shown as a default, in one option, since the focus is on Application A. Optionally, these items can be shown based on a user command, for instance, as depicted in FIG. 5B. A common generalized external vertex 500 is depicted for Application A and Application B, showing an edge 520 to Servlet A1, an edge 521 to Servlet A2 404 and an edge 522 to Application B 504.

FIG. 5B depicts a dependency graph with details for Application A and Application B, based on the pruned dependency digraphs of FIGS. 4H and 4K. In this option, the vertex or nodes 412 and 431 for Servlet B1 and Database Y, respectively, are shown, along with the outgoing edge 526 between Servlet B1 412 and Database Y 431. The user can select this option to view more detail regarding one or more Business Transactions under diagnosis. In this example, Application B is invoked, and is part of, the Business Transaction BTB1. Servlet B1 is the only front end of Application B and is displayed inside the node 504 named Application B. Generally, the user can select summary or detailed views of the applications in the dependency graph.

FIG. 6A depicts a user interface (UI) which provides a summary view of a Business Service, based on the pruned dependency digraphs of FIGS. 4H and 4K. The UI 600 includes a tree region 602 with labeled nodes which the user can expand or collapse, and select. The tree includes a node which can be selected to provide a Business Service view, where an example sub-node of Business Service 1 is provided, and a node which can be selected to provide a front end view. Business Service 1 has been selected by the user, as indicated by the bolded, underlined, italicized text, and the current display of a dependency graph 601 is based on this selection. A button 604 is selected to provide a summary view of the dependency graph 601, while a button 606 could be selected to alternatively provide a detailed view.

A Business Service can include multiple Business Transactions interacting with each other to accomplish a common shared goal such as to execute a stock trade for a stock trading web site, buy a book for a book-selling web site, or enroll in benefits for a company's benefits program. In our example, BTA1 and BTA2 are Business Transactions which are part of the same Business Service (Business Service 1). The summary of a Business Service can be defined by a dependency graph which provides a union of all vertices and edges included in BTA1 and BTA2. Moreover, additional placeholder nodes 608 and 612 can be provided to represent BTA1 and BT2, respectively. In this view, no special highlighting is provided for the edges and nodes.

The dependency graph can be geared towards first and second level triagers, whose roles include monitoring applications/transactions and notifying appropriate business and IT owners if any problems are encountered by a particular application/transaction. For these purposes, it can be sufficient to identify an application without specifying a component of the application. Since the detailed view of an application may become complicated with the increase in the number of applications and interesting software components, the summary dependency graph view of an application is helpful because it reduces the complexity by hiding lower level details from the user.

In the summary view, all the front end components of an application are hidden in the application node. The edges coming out from an application to its back end components are depicted, in addition to cross-JVM edges. Further, the application nodes can be decorated with application metrics, while the edges (e.g., between applications and their back-ends, and between applications and cross-JVM applications) can be decorated with backend relational metrics. The edges between an application node and certain backend types (e.g., Web Service and EJB back ends) can be grouped together to reduce the complexity of the summary dependency graph view. Users are allowed to create alerts on these nodes and edges to monitor the health of an application and its relationship with its back ends. An alert icon for a vertex or an edge shows up if an alert is set on their performance metric. The alert icon is an indicator of an application's performance and helps the user monitor and diagnose the health of an application and its back ends. In one approach, the alert icon is a color coded circle which can appear in one of several states: normal (green), caution (yellow) or danger (red). For simplicity, a dark circle here indicates a danger or abnormal state and an open circle indicates a normal state.

For example, the Application B node 504 has an alert icon 613 indicating a normal state for the metrics of Application B. The Application A node 502 has an alert icon 611 indicating a danger state for the metrics of Application A. As a result, the BTA1 node 608 and the BTA2 node 612 also have alert icons 608 and 609, respectively, which also indicate a danger state for these Business Transactions as a whole. The alert icon 611 is set based on aggregated metrics across multiple instances of Application A, such as an average response time. Similarly, the alert icon 613 is set based on aggregated metrics across multiple instances of Application B.

Metrics can also be displayed within, or proximate to, a node. See FIGS. 8C and 8D for an example.

The user can select one of the Business Transactions to cause the dependency graph to be modified to provide information which is specific to the selected Business Transaction, as discussed in connection with FIGS. 6B-6D. This selection can be made, e.g., by using a pointing device such as a mouse which is placed over one of the nodes 608 and 612, or via the tree in region 602.

The dependency graph 601 graphically depicts: (a) a first node (such as node 502) which represents multiple instances of a first application (such as Application A), (b) a second node (such as node 504, 401 or 431) which represents one subsystem on which the first application depends (such as Application B, Database X or Database Y, respectively) and (c) at least one edge/arrow which represents a dependency of the first application on the one subsystem. For example, edges 523 and 525 represent a dependency of Application A on Application B, edge 525 represents a dependency of Application A on Database X and edges 523, 524 and 526 represent a dependency of Application B on Database Y. One subsystem can depend on another subsystem directly, such as when the one subsystem calls the another subsystem, or indirectly, such as when the one subsystem calls an intermediate subsystem that calls the another subsystem (or the intermediate subsystem calls another intermediate subsystem that calls the another subsystem, and so forth). Generally, a subject subsystem can be said to depend on any downstream subsystem in an execution flow or sequence of invoked resources.

The first node can represent different instances of the first application which have different front end components. For example, one instance of Application A can have the front end component Servlet A1 and another instance of Application A can have the front end component Servlet A2 (see FIG. 4E).

The first node can represent different instances of the first application which are invoked in different business transactions. For example, one instance of Application A can be invoked in BTA1 (but not BTA2) and another instance of Application A be invoked in BTA2 (but not BTA1) (see FIG. 4E).

The first node can represent different instances of the first application which are called by different external components. For example, one instance of Application A can be called by the external vertex 360 (FIG. 4A) and another instance of Application A can be called by external vertex 370 (FIG. 4B).

The first node can represent one instance of the first application which depends on one subsystem, and another instance of the one of the respective applications which does not depend on the one subsystem. For example, one instance of Application A may depend on Database X while another instance of Application A does not access Database X such as due to an error or network failure or availability.

The dependency graph can also graphically depict: (d) a third node which represents another subsystem, and (e) at least one edge which represents a dependency of the first application on the another subsystem. For example, consider the first node as node 502 of Application A as a first application, the second node 504 of Application B as one subsystem which Application A depends on, and the third node 401 of Database X as another subsystem which Application A depends on. The edges 525 can represent a dependency of Application A on Database X 401. It is possible for one instance of Application A to depend on Application B but not Database X, and for another instance of Application A to depend on Database X but not Application B.

Further, the dependency graph can graphically depict: (a) a first node (e.g., node 502) which represents multiple instances or deployments of one application (e.g., Application A) of a number of respective applications, (b) a second node (e.g., node 504) which represents multiple instances of another application (e.g., Application B) of the respective applications, and (c) at least one edge (e.g., 523, 524) which represents a dependency of the one of the respective applications on the another of the respective applications.

At least one instance of the one of the respective applications can call at least one instance of the another of the respective applications via a web service (e.g., Web Service Client 442), and the dependency graph graphically depicts the web service.

At least one instance of the one of the respective applications can call at least one instance of the another of the respective applications via a cross-JVM call (e.g., the call from Application A to Application B is a cross-JVM call—see FIG. 4I).

The first node can represent at least one instance of the one of the respective applications (e.g., Application A) which calls the another of the respective applications (e.g., Application B), and another instance of the one of the respective applications which does not call the another of the respective applications. For example, as mentioned, due to an error or network availability, one subsystem may or may not call another subsystem at different times.

The dependency graph 601 advantageously aggregates multiple instances of BTA1 and BTA2 to provide a view of all paths and subsystems which are invoked in a given time period.

FIG. 6B depicts the user interface of FIG. 6A after a Business Transaction BTA1 is selected. Note that the BTA1 node is highlighted in the tree region 602. The summary view of a Business Transaction can display the flow of transactions over an application summary view. All of the nodes called from a front end can be included in the view even though they are not part of the Business Transaction. However, only the nodes and edges which are part of the Business Transaction are highlighted, in one approach. This includes nodes 608, 502 and 401 and the edges 627 and 525 between them. An incoming edge to an application may not be included if the incoming edge is not part of the Business Transaction. Here, in the UI 610, a summary view of the Business Transaction BTA1 is provided by the dependency graph 603. Though the edge 523 between Application A 502 and Web Service 442, and the edge 524 between Web Service 442 and Application B 504 are not part of BTA1, they are still displayed, but not highlighted. The edges which are part of BTA1 (627 and 525) are highlighted since they are part of BTA1. Since Application B is not part of BTA1, the edge between Application B 504 and Database X 431 is not displayed, in one approach.

The highlighting can be achieved using various visual techniques such as different colors, thicker node borders and edges (as is done here) and so forth.

The dependency graph 603 advantageously aggregates multiple instances of BTA1 to provide a view of all paths and subsystems which are invoked in a given time period for BTA1.

In the dependency graphs which are specific to a selected Business Transaction, alert icons and metrics can be provided which are also specific to the selected Business Transaction. For example, a metric or alert icon for Application A can be aggregated over instances of Application A which were invoked in connection with BTA1, but not over instances of Application A which were invoked in connection with another Business Transaction such as BTA2.

The dependency graph can graphically depict: (a) a first identifier (e.g., BTA1 in node 608) which represents a first business transaction (BTA1) in which a first application (e.g., Application A) is invoked, (b) a node (e.g., 502) which represents multiple instances of the first application, (c) a node (e.g., 401) which represents one subsystem (e.g., Database X) on which the first application depends, in connection with the first business transaction, and (d) at least one edge (e.g., 525) which represents a dependency of the first application on the one subsystem, in connection with the first business transaction. The instances of Application A and Database X may be connected to BTA1 because they are invoked in execution flows which are associated with BTA1 by virtue of one of more Business Transaction Components being invoked in the execution flows (see also FIG. 8A).

The first identifier can be graphically depicted by a node (e.g., 608) connected by at least one edge (e.g., 627) to the node (e.g., 502) which represents the multiple instances of the first application.

Figure 6C:
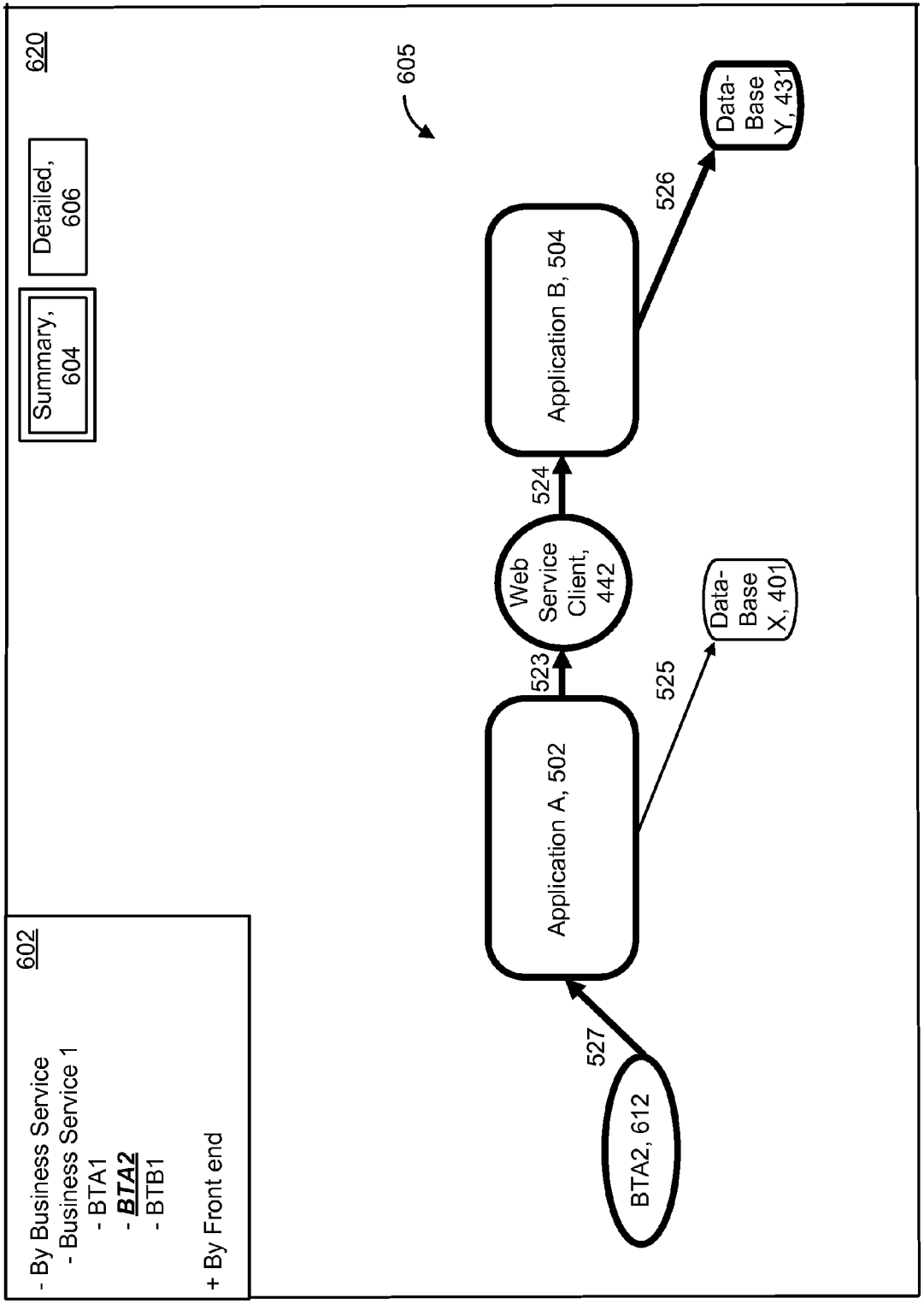
FIG. 6C depicts the user interface of FIG. 6A after a Business Transaction BTA2 is selected.

The first application can also be invoked in a second business transaction (e.g., BTA2—see FIG. 6C). In this case, the dependency graph can graphically depict: (e) a second identifier (e.g., BTA2 in node 612) which represents the second business transaction, (f) a node (e.g., Application B) which represents another subsystem on which the first application depends, in connection with the second business transaction, and (g) at least one other edge (e.g., 523, 524) which represents a dependency of the first application on the another subsystem, in connection with the second business transaction.

Responsive to a user selection of the first business transaction (e.g., node 608), the dependency graph visually distinguishes the first identifier over the second identifier, and possibly other Business Transaction identifiers, the node which represents the one subsystem over the node which represents the another subsystem, and the at least one edge over the at least one other edge, as shown in FIG. 6B.

The first application can be invoked by the first business transaction by virtue of at least a first preselected component (e.g., Servlet A1—see FIG. 4E) of the first application being invoked, and the first application can also be invoked by the second business transaction by virtue of at least a second preselected component (e.g., Servlet A2—see FIG. 4E) of the first application being invoked.

FIG. 6C depicts the user interface of FIG. 6A after a Business Transaction BTA2 is selected. Note that the BTA2 node is highlighted in the tree region 602. In the UI 620, in the dependency graph 605, the summary view of BTA2 highlights the BTA2 node 612, the Application A node 502, the Web Service Client node 442, the Application B node 504 and the Database Y node 431 and the edges between them (edges 527, 523, 524 and 526). The highlighted edges include the edge 526 between Application B 504 and Database Y 431, which is not included in BTA1's summary view (FIG. 6B). The edge 525 between Application A 502 and Database X 401 is not highlighted since it did not take part in BTA2's transaction flow. This allows the triager to quickly concentrate troubleshooting efforts on the related components.

The dependency graph 605 advantageously aggregates multiple instances of BTA2 to provide a view of all paths and subsystems which are invoked in a given time period for BTA2.

FIG. 6D depicts the user interface of FIG. 6A after a Business Transaction BTB1 is selected. Note that the BTB1 node is highlighted in the tree region 602. In the UI 630, in the dependency graph 607, the summary view of BTB1 highlights a BTB1 node 614, the Application B node 504 and the Database Y node 431 and the edges between them.

The dependency graph 607 advantageously aggregates multiple instances of BTB1 to provide a view of all paths and subsystems which are invoked in a given time period for BTB1.

FIG. 7A1 depicts a user interface which provides a summary view based on the pruned dependency digraphs of FIGS. 4H and 4K, where an Application A is selected in a front end view. This selection can be made by clicking on the Application A node 502 or via the tree region 602, where the selection is indicated by the highlighting of the Application A node. In the UI 700, the dependency graph 701 provides a front end view for Application A by identifying all nodes which it depends on, and the edges between these nodes, without regarding to a Business Transaction definition. An additional region 702 of the UI 700 can provide information for the selected node in the tree region 602. For example, the additional information includes the components of Application A and the components that they call. Specifically, Application A includes Servlet A1 which calls Database X, and Servlet A2 which calls a Web Service Client. Each component name can be a hyperlink which can be selected by the user to obtain additional component-specific information.

FIG. 7A2 depicts an aging process applied to the user interface of FIG. 7A1. An aging process can be applied in any of the dependency graphs to remove components which are less relevant because they have not been invoked recently. This helps to focus the user's diagnosis effort on alive transactions. The aging of vertices and edges can be based on the age of a last invoked edge. The age can be an elapsed time from the current time or from another reference time. If the age of an edge is older than a first threshold age, that edge can be rendered to have an aged appearance which is a different visual appearance compared to the nominal case where the age does not exceed the first threshold age. A vertex can be depicted with an aged appearance if all its incoming and outgoing edges have an aged appearance. Further, the vertices and edges can be removed from the dependency graph completely if the age exceeds a second threshold age, higher than the first threshold age. These threshold ages can be user-configurable. In the UI 704, in the dependency graph 711, a dotted line indicates that Database X, 401 and the edge 525 to it from Application A 502 indicates an aged appearance. Thus, the Database X node 401 and the edge 525 are older than the first threshold age. In this example, the (Application A, Database X) edge is still included in the view as its last reported date still falls within the removal window. That is, the age of the edge is greater than the first threshold age but less than the second threshold age.

In one scenario, consider Application A as a first application (represented by a first node 502) and Database X as one subsystem (represented by a second node 401) which Application A depends on. When an elapsed time since the first application (Application A) called the one subsystem (Database X) exceeds a threshold (first threshold age), the dependency graph graphically depicts aging of the second node (401). Or, when an elapsed time since the first application called the one subsystem exceeds a threshold (second threshold age), the dependency graph is updated to remove the second node.

FIG. 7A3 depicts another example of an aging process applied to the user interface of FIG. 7A1. The UI 706 provides a dependency graph 708. In another scenario, consider Application A as a first application (represented by a first node 502), Application B as one subsystem (represented by a second node 504) which Application A depends on, and Database Y as another subsystem (represented by a third node 431) which Application B depends on. The dependency graph can graphically depict: (d) the third node (431) which represents another subsystem, and (e) at least another edge (526) which represents a dependency of the one subsystem on the another subsystem. When an elapsed time since the first application called the one subsystem exceeds an associated threshold (first threshold age), and an elapsed time since the one subsystem called the another subsystem exceeds an associated threshold (first threshold age), the dependency graph can graphically depict aging of the second node. This aging is shown by the dotted border of the Application B node 504.

In another approach, when an elapsed time since the first application called the one subsystem exceeds an associated threshold (second threshold age), and an elapsed time since the one subsystem called the another subsystem exceeds an associated threshold (second threshold age), the dependency graph can be updated to remove the second node. This is indicated by FIG. 7A4. FIG. 7A4 depicts a further example of an aging process applied to the user interface of FIG. 7A1. The UI 710 provides a dependency graph 712. When a node is removed due to aging, all of the downstream nodes and edges can also be removed, in one approach. Further, a Web Service call to the node can be removed.

Figure 7B:
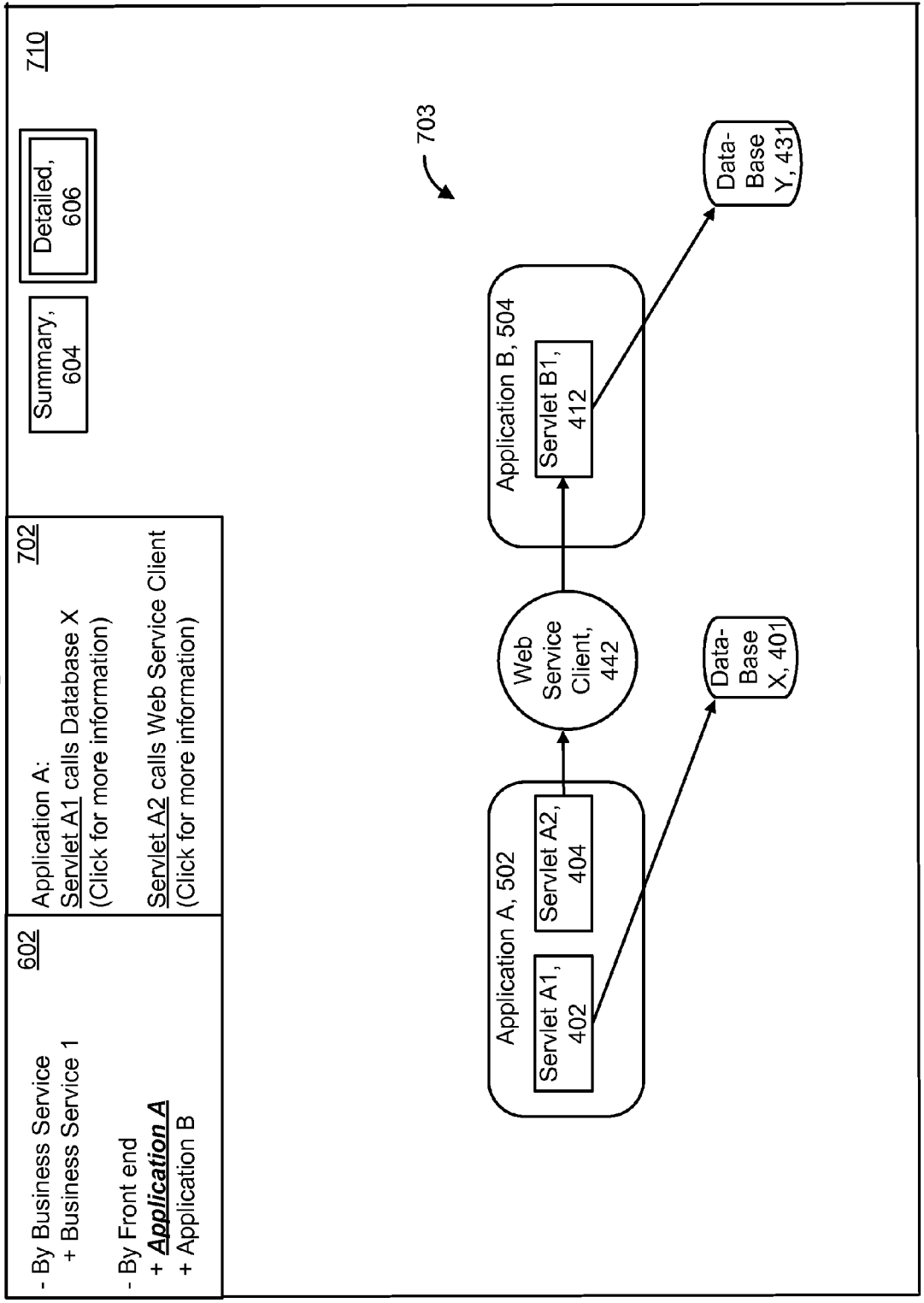
FIG. 7B depicts the user interface of FIG. 7A in a detailed view.

FIG. 7B depicts the user interface of FIG. 7A in a detailed view. In the UI 710, the button 606 for a detailed view is selected so that the dependency graph 703 identifies the components which are invoked in each application. In one approach, the detailed view of an application node displays the front end components for Business Transactions which involve the application. Specifically, within the Application A node 502, Servlet A1 402 and Servlet A2 404 nodes are displayed, and within the Application B node 504, the Servlet B1 node 412 is displayed. The edges are also modified so that they are connected to a specific component rather than to the application node.

The dependency graph can thus be alternatively provided in a summary view or a detailed view based on a user selection, where in the summary view, a first node (such as node 502) represents multiple instances of one application (e.g., Application A) of a number of respective applications without identifying invoked components of the multiple instances of the one of the respective applications, and in the detailed view, the first node represents the multiple instances of the one of the respective applications while identifying invoked components (e.g., Servlets A1, Servlet S2) of the multiple instances of the one of the respective applications.

FIG. 7C depicts a user interface which provides a summary view based on the pruned dependency digraph of FIG. 4K, where an Application B is selected in a front end view. In the UI 720, the dependency graph 705 displays the Application B node 504, the Database Y node 431 and the edge 526. The nodes which are upstream of Application B and which call Application B are not displayed. This view allows the user to focus on a specific application and the subsystems it calls. The additional region 702 is updated to provide information regarding Servlet B1 in Application B.

FIG. 7D depicts the user interface of FIG. 7C in a detailed view. In the UI 730, the button 606 for a detailed view is selected so that the dependency graph 707 identifies the components which are invoked in each application. Specifically, within the Application B node 504, Servlet B1 412 is displayed. The edge 526 is also modified so that it is connected to Servlet B1 rather than to the application node 504.

Figure 7E:
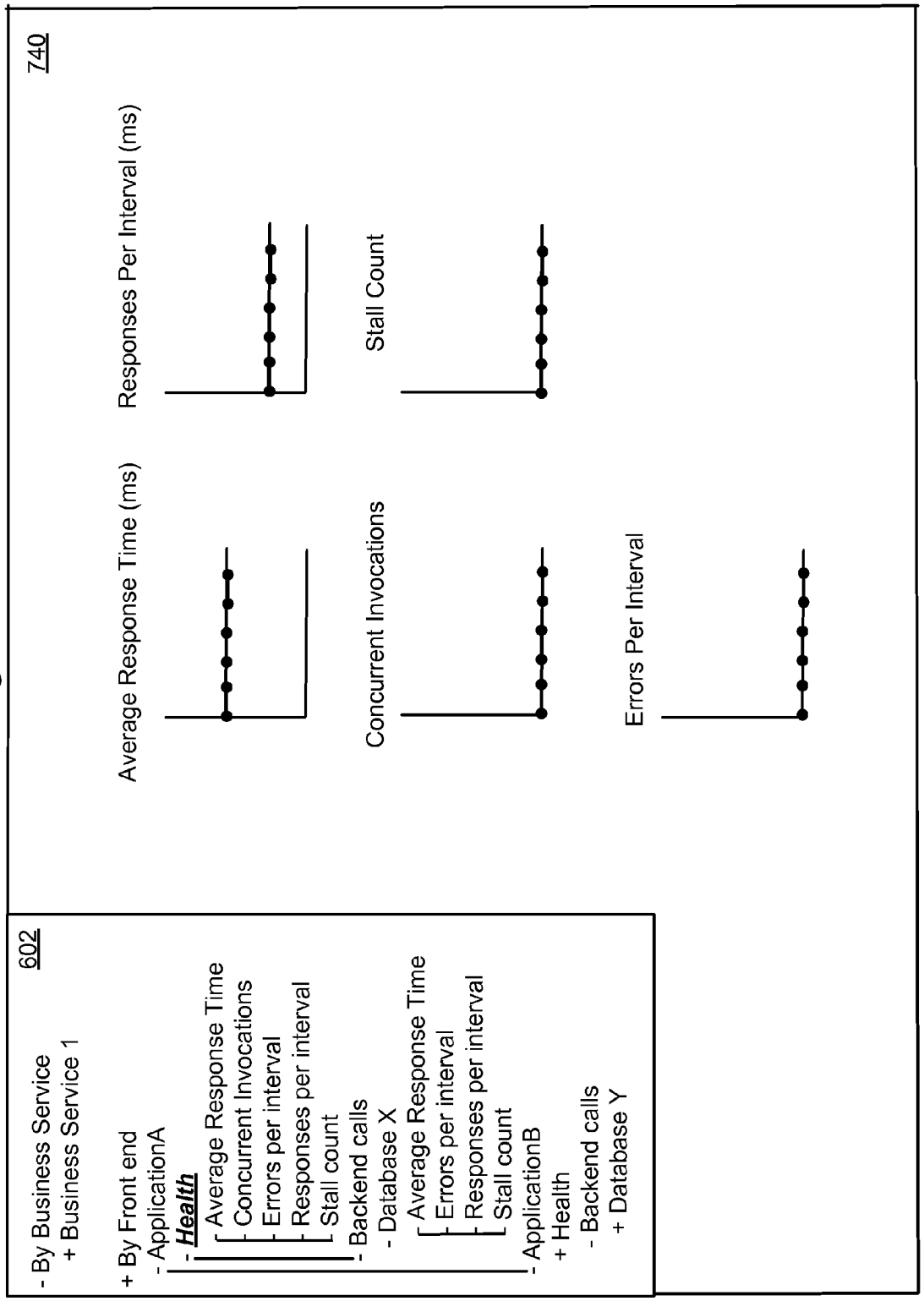
FIG. 7E depicts a user interface which provide health metrics for Application A based on the user interface of FIG. 7A or 7B.

FIG. 7E depicts a user interface which provide health metrics for Application A based on the user interface of FIG. 7A or 7B. Health or performance metrics for a front end subsystem such as a particular application can be accessed via the tree region 602, which is expanded. In this example, the node Health under Application A is selected. The health metrics can include graphs, tables, or other visual presentations which provide information such as average response time, responses per interval, concurrent invocations, errors per interval and stall count.

The response time can be an average over multiple invocations of multiple instances of Application A in a time interval. The remaining metrics are similarly aggregated over the time interval.

Figure 8A:
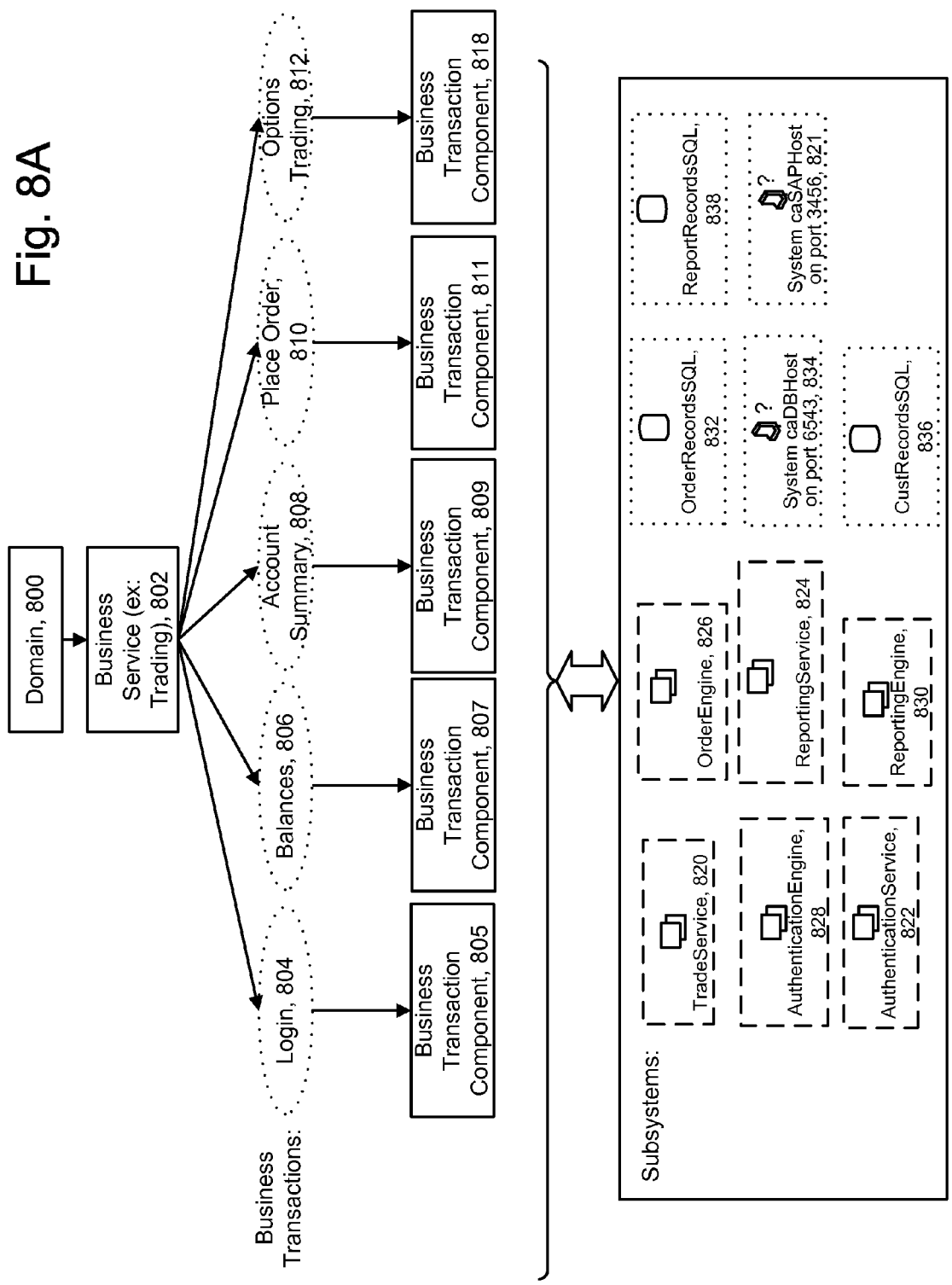
FIG. 8A depicts a hierarchy for use in describing the operation of one or more applications.

FIG. 8A depicts a hierarchy for use in describing the operation of one or more applications. A specific example relating to a Business Service involving securities trading is presented. The different levels of the hierarchy can be defined based on any desired organizational structure. For example, the hierarchy can include human-facing terminology, that is, terminology which facilitates understanding of client's interactions with a monitored application. A hierarchy may encompass any type of interaction with an application, whether the interaction is in the realm of a for-profit business, such as for e-commerce transactions, educational organization or government organization, for instance. Further, the one or more hierarchies can include nodes at different levels of the one or more hierarchies, where each node has a descriptive name. The hierarchy can be considered to be an abstract construct which provides a way to organize information about how an application executes in a manner which is more understandable to the human operator.

A top level of the hierarchy is a domain level 800 named "Domain." A next level of the hierarchy is a Business Service level 802. An example of a Business Service relates to trading involving a stock or other financial instrument using a web site. Thus, "Trading" can be the name of a node at the Business Service level of the hierarchy. A specific instance of the Trading Business Service occurs, e.g., when a particular user executes a trade. Other example Business Services include "Buy Book" for a book-selling web site, and "Enroll in benefits" for a employees enrolling in a benefits program.

A next level of the hierarchy is a Business Transaction level. As mentioned, a Business Transaction can represent a task from a client perspective, such as logging into a web site, ordering an item, and so forth. A Business Service can be made up of a number of Business Transactions. For example, for Trading, the Business Transactions can include: Login 804 (e.g., login to the web site), Balances 806 (e.g., obtain a balance of an account), Account Summary 808 (e.g., obtain a report of recent buy/sell activity), Place Order 810 (e.g., place an order to buy or sell a security such as a stock or bond-something other than an option) and Options Trading 812 (perform an action such as researching and/or making an options trade). A specific instance of Login occurs when a user attempts to login to an account.

Further, a Business Transaction can be associated with one or more Business Transaction Components. A Business Transaction Component can be any type of component of an application, such as a servlet or EJB. In one approach, one of the components of an application is set as a Business Transaction Component, which is an identifying transaction component for a Business Transaction. An individual transaction that the Business Transaction Component is associated with the identifying transaction. A transaction can represent a sequence of software components which are invoked in response to a request from a client, to provide a corresponding response to the client. For example, a Business Transaction Component can be identified by determining when component data reported by an agent matches a set of rules. This definition can include, e.g., a specified URL host name, URL parameters, HTTP post parameters, cookie and/or session manager parameters. Additionally, or alternatively, the definition may require a transaction to start with a specified URL host name. The agent or manager, for instance, can compare the component data against the set of rules to determine when a Business Transaction Component is present in a Business Transaction. If a Business Transaction Component is detected, then the associated Business Transaction is of a specified type. For example, if the Business Transaction Component 805, 807, 809, 811 or 813 is detected, then the associated Business Transaction is Login 804, Balances 806, Account Summary 808, Place Order 810 or Options Trading 812, respectively.

For a transaction which is associated with a web page, the Business Transaction Component might be invoked in connection with a low level component used in a web page, such as an image (e.g., .gif file), cascading style sheet (e.g., .css file), JavaScript code component (e.g., .js file) and so forth. For a transaction which is associated with a servlet, a Business Transaction Component might be invoked in connection with a JavaServer Page (JSP) that is loaded into a secondary frame.

Typically, each instance of a Business Transaction involves execution of code of a sequence of one or more of applications or other subsystems. The subsystems depend on one another, e.g., call one another, in a serial or branched chain. Different Business Transactions can sometimes use a common subsystem. A subsystem can include one or more software components which perform a specific task.

The example subsystems include instrumented subsystems which are represented by dashed line boxes, and which are typically front end subsystems, as well as un-instrumented subsystems which are represented by dotted line boxes, and which are typically back end subsystems. A front end subsystem can call another front end subsystem, such as via a Web Services call. Or, a frontend subsystem can call a back-end subsystem. A full range of performance metrics can be obtained from an instrumented subsystem. Limited information may be obtained regarding an un-instrumented subsystem from the methods that are used to call out to them from the instrumented subsystems. In the case of un-instrumented databases, for example, a JDBC driver (located in the same Java Virtual Machine (JVM) as the calling front end) provides metrics that give us an idea of the responsiveness of the database. In the case of un-instrumented mainframes, there is usually a method that calls out to the mainframe on a specified port on the mainframe, and we can measure how long that call takes or if it stalls or reports an error.

In many cases, an un-instrumented subsystem is a back end subsystem such as a mainframe, database or some other un-instrumented computing device. These are unknown components/destinations. The instrumented subsystems include: TradeService 820, OrderEngine 826, AuthenticationEngine 828, ReportingService 824, AuthenticationService 822 and ReportingEngine 830. The un-instrumented subsystems include: OrderRecordsSQL 832, ReportRecordsSQL 838, a system caDBHost 834, which is accessed via its port number 6543, a system caSAPHost 821, which is accessed via its port number 3456 and CustRecordsSQL 836. A subsystem which includes SQL in its name is a Structured Query Language (SQL) database. A "?" indicates that the subsystems 834 and 821 are unknown.

Component-oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. One example of a component oriented programming model is J2EE, which can employ components such as a Java Server Page, an Enterprise Java Bean (EJB), a servlet, and a Java Database Connectivity (JDBC) component. JDBC is an Application Programming Interface (API) for the JAVA™ programming language that defines how a client may access a database. It provides methods for querying and updating data in a database. However, other component oriented programming models such as .NET may also be used. Moreover, the programming model need not be object oriented.

In one possible implementation, a component is a class-method (CM) pair. For example, a servlet is one example of a JAVA class. It is an object that receives a request and generates a corresponding response. A class-method pair can be represented by the notation class.method. An example format of a class-method pair is: ServletA1.EnterOrder.

Figure 8B:
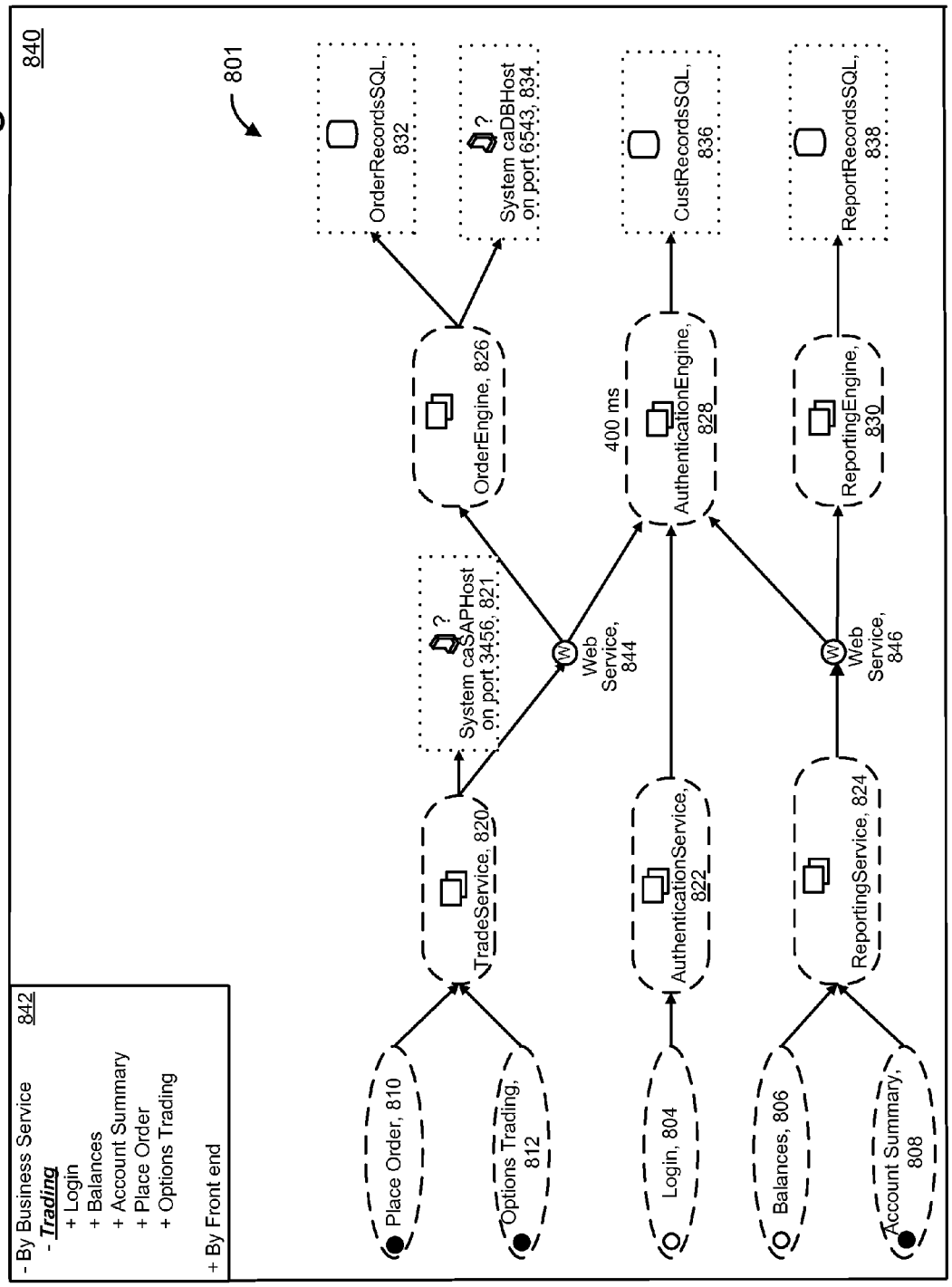
FIG. 8B depicts a further example of a user interface, consistent with the hierarchy of FIG. 8A, where a Business Service of Trading has been selected by the user.

FIG. 8B depicts a further example of a user interface, consistent with the hierarchy of FIG. 8A, where a Business Service of Trading has been selected by the user. The UI 840 includes a region 842 in which a tree is provided to allow the user to select a view based on a Business Service or front end. A Business Service of Trading is selected. Trading includes the Business Transactions of Balances, Login, Place Order, Options Trading and Account Summary as discussed.

In response to this selection, a number (one or more) of associated Business Transactions, subsystems of the Business Transactions, and edges which show dependencies among the subsystems, are displayed in the dependency graph 801. The oval-shaped nodes 804, 806, 808, 810 and 812 on the left hand side identify the Business Transactions. Edges indicate which subsystem is first invoked for a Business Transaction, and the subsystems which are subsequently invoked. In some cases, a common subsystem is invoked for different Business Transaction instances. The components which are invoked for a given Business Transaction instance can be separately tracked using unique identifiers, even when the components are at the same subsystem. Moreover, it is possible for separate instances of a component or application to be invoked at a subsystem in different Business Transaction instances. Again, these separate instances can be separately tracked.

Also, note that separate instances of the same Business Transaction need not invoke the same subsystems. For instance, due to an error or network failure or availability, a Business Transaction instance may not invoke a particular subsystem which would otherwise be invoked when no error occurs. Or, due to the time of day or available resources, separate instances of the same Business Transaction can invoke different subsystems. Many variations are possible.

The border of the nodes is used to depict whether the node is highlighted, and in some cases, a type of highlighting. Highlighting is one way to visually distinguish a node or edge from other nodes or edges, respectively. Different colors may also be used. In one approach, a dotted or dashed line border indicates no highlighting, while a solid line indicates highlighting. The highlighting of a node can be responsive to a user selection in the region 842 and to a user selection of the node itself in the UI. Various highlighting, color coding and other visual effects can be provided to convey information to the user. Some of the subsystem nodes include: (a) a symbol such as two overlapping screens which represents a front end or aggregated front end (e.g., all servlets that share the same application context), (b) a cylinder-shaped symbol that represents a database or (c) a symbol that represents an unknown (un-instrumented) subsystem which is the destination of a socket call, to identify a type of the subsystem.

Other types of notations involve metrics and alerts. Alerts are available for Business Transactions (based on the associated component data), for a front end's overall performance ("Health"), and for back end calls made by the front end to an un-instrumented back end or to another front end. Calls made to another front end can be made through Web Services or EJB Clients to appear as such on the graph. As mentioned, these alerts can be created and configured by a user. Thus, any given Business Transaction, front end, or back end call might or might not have an alert defined for it.

The front end subsystems can make a call out of the application server through a socket. Those calls could be Web Services calls, JDBC driver calls or other types of calls. Web Services are typically application programming interfaces (API) or Web APIs that are accessed via Hypertext Transfer Protocol (HTTP) and executed on a remote system hosting the requested services. These calls, and others such as the JDBC driver calls, are still in the application server so we can detect them and obtain metrics regarding them, but since they call out of the application server, they are referred to as back end calls. The destinations of these back end calls are either other front ends (in the case of Web Services and some EJB calls) or un-instrumented back end components. Most of these un-instrumented components can be at least partially identified from the back end call; for instance, JDBC driver calls are labeled with their destination database name, and the default socket calls are labeled with the destination host and port. In other cases, the user may have defined custom calls and labeled them with their destination. In all these cases, the UI can provide a box representing the back end destination, labeled appropriately and with an icon depicting a database or other appropriate type of component.

For instance, if there is a call through a socket and we have instrumented the call and knew that it took 56 milliseconds, but we do not know its destination (what subsystem it called), we can display that time metric in the UI alongside a back end node showing an "unknown component" icon and labeled with the system hostname and port. The back ends 821, 832, 834, 836 and 838 are essentially dummy nodes in the graph because they represent a destination which is not instrumented and for which we therefore have no information reported by the destination. For a call from one front end to another, full instrumentation is available. The call may be made, e.g., via Web Services or an EJB client. All Web Services calls originating from a single front end are aggregated and represented as a single "Web Services" back end call; thus, unlike other types of calls, a Web Services call may have more than one destination. In this case, the back end call will appear as a forking or branching arrow in the graph. Web Services 844 and 846 (represented by "W") represent two such forking Web Services calls; contrast these with the call between AuthenticationService 822 and AuthenticationEngine 828, which is also a Web Services call, but with a single destination.

The TradeService node 820, for instance, can represent a summary of multiple instances of the TradeService subsystem which run across multiple machines. The Web Services 844 are associated with one or more computing device/machines on which the TradeService 820 subsystem runs, and the Web Services 846 are associated with one or more computing device/machines on which ReportingService 824 subsystem runs. The metric or alert icons for Web Services 844 and 846 represent the performance or health of the method call(s) that were made from one computing device to a next computing device.

In one approach, the alert relates to a time metric such as a response time. The alerts can be configured based on any type of performance metric. For example, instrumentation can yield many types of performance metrics, including an average execution or response time of a component, an invocation rate per second or per interval, a count of invocations, a concurrency metric indicating a number of invocations that have started but not finished per interval, and a stalled metric indicating a number of invocations that have started whose method invocation times have exceeded a specific threshold per interval. Further, the data can identify a garbage collection heap size, a bandwidth metric indicating file and socket activity, a number of threads, system logs, exceptions, memory leaks and component interactions. These are examples of component data obtained at application runtime and reported by an agent. Alerts can be provided for any of the items.

Moreover, an alert can be configured based on one or more performance metrics for a Business Transaction Component. For example, an alert can represent an average response time of a subsystem over a specified period of time.

Based on the alerts and metrics icons, the user can take various steps to obtain further information regarding the Business Transactions, subsystems and calls depicted in the UI. In one approach, the user is guided by the presence of the alerts and metrics icons and seeks to obtain further information regarding the associated Business Transactions, subsystems and calls, such as to diagnose a problem.

Referring to the specific Business Transactions and their subsystems, the UI indicates that Place Order 810 and Options Trading 812 both invoke the front end application/subsystem, TradeService 820. In an example scenario, a user initiates Place Order 810 by defining an order which is to be placed, e.g., to buy or sell a stock or bond. All user inputs, and information or instructions presented to the user, can be provided via a web page or other UI. Or, a user initiates Options Trading 812 by defining a trade involving an option, such as a put or call. In either case, TradeService is used. TradeService calls System caSAPHost 821, such as to obtain additional information to process the order/trade. Little is known about the System caSAPHost 821 because it is not instrumented, so the node for it is merely a placeholder. The port of the computing device 821 which is called by the instance of TradeService is known (e.g., port 3456), and this information is used to decorate the node 821. System caSAPHost 821 could call another host or resource (not shown) as well, but this would not be depicted.

In computer networking, a port is an application-specific or process-specific software construct serving as a communications endpoint. It is used, e.g., by Transport Layer protocols of the Internet Protocol Suite, such as Transmission Control Protocol (TCP) and User Datagram Protocol (UDP). A specific port is identified by its number, commonly known as the port number, the IP address with which it is associated, and the protocol used for communication. TCP and UDP specify a source and destination port number in their packet headers. A process associates its input or output channel file descriptors (sockets) with a port number and an IP address, a process known as binding, to send and receive data via a network. The operating system's networking software has the task of transmitting outgoing data from all application ports onto the network, and forwarding arriving network packets to a process by matching the packets IP address and port numbers.

Processes create associations with transport protocol ports by means of sockets. A socket is the software structure used as the transport end-point. It is created by the operating system for the process and bound to a socket address which consists of a combination of a port number and an IP address. Sockets may be set to send or receive data in one direction at a time (half duplex) or simultaneously in both directions (full duplex).

TradeService 820 uses one or more Web Services (aggregated into a Web Services nodes 844) to request the order/trade. Web Services 844 in turn call: (a) the OrderEngine subsystem 826, which processes the order/trade, and/or (b) the AuthenticationEngine subsystem 828, which authenticates the order/trade, such as by verifying the user's credentials. The graph does not necessarily indicate that TradeService calls both of these other subsystems at approximately the same time or at different times (e.g., maybe it was after the call to the OrderRecordsSQL database was made); as part of the same Business Transaction or as part of different Business Transaction (there are two Business Transactions associated with TradeService, after all); etc. It's also possible they were both called as part of the same Business Transaction but during different instances of it. The graph tells us that at some point in a specified time period, TradeService called both of these front ends, using Web Services 844.

The OrderEngine subsystem 826 calls two back ends to service one or more calls from Web Services 844: the OrderRecordsSQL database 832, which stores order records using SQL, and System caDBHost 834. System caDBHost 834 may be used to obtain additional information to process the order/trade. The AuthenticationEngine subsystem 828 calls the CustRecordsSQL database 836, which stores customer records, such as to confirm that the user/customer is authorized to place the order/trade.

The Business Transaction of Login 804 involves the front end subsystem, AuthenticationService 822. In an example scenario, Login invokes the AuthenticationService subsystem 822 which in turn calls the AuthenticationEngine subsystem 828, which could be on the same server, or a different server, than the AuthenticationService subsystem 822. The AuthenticationEngine subsystem 828 calls the CustRecordsSQL database 836 to access customer records to confirm that the user login matches the password. The control flow returns to the AuthenticationService subsystem 822 at which point the instance of the Login Business Transaction ends.

Both Balances 806 and Account Summary 808 invoke a common front end application/subsystem, ReportingService 824. In an example scenario, a user initiates Balances by making a request to obtain an account balance, e.g., to learn the amount of funds in a particular account. Or, a user initiates Account Summary 808 by making a request to obtain a report (e.g., statement) of recent transactions, e.g., orders/trades, fund transfers and so forth. In either case, ReportingService 824 processes the report request by calling the Web Services 846, which in turn calls the AuthenticationEngine subsystem 828, which may call the CustRecordsSQL database 836 to access customer records to confirm that the user/customer is authorized to obtain a report.

In one implementation, the control flow returns to the ReportingService 824, which makes another call via the Web Services 846 to the ReportingEngine subsystem 830, which fulfills the report request by calling the ReportRecordsSQL database 838, to obtain records which are used to provide the report. This call to Web Services 846 may include information which specifies the type of report desired, an account identifier, a time frame involved and so forth.

FIG. 8C depicts the user interface of FIG. 8B, where a Business Transaction of Place Order has been selected by the user. In the UI 850, the dependency graph 803 highlights the nodes and edges which are associated with one or multiple instances of Place Order. The highlighted nodes are: 810, 820, 821, 844, 826 and 832 and the highlighted edges are the arrows between these nodes. Example time metrics are also displayed, such as above or within a corresponding node. That is, the UI and its nodes and edges can be decorated with the metrics. Here, an example aggregate response time is 1200 msec. for TradeService 820 and an example aggregate response time is 200 msec. for the call from TradeService 820 to the backend 821, represented by edge 853. Moreover, alert icons 851 and 852 are associated with nodes 810 and 820, respectively. An alert icon 855 is associated with the edge 853. These metrics may be for a single instance of a Business Transaction such as Place Order or, more commonly, an average over multiple instances of the Business Transaction, such as over a specified time interval.

The edge 853 is thus decorated with at least one of: an aggregate metric "200 msec." and an alert 855 based on the aggregate metric, and the node 820 is a first node which is decorated with at least one of an aggregate metric "1200 msec." and an alert 852 based on the aggregate metric.

Due to the highlighting of nodes and edges, the user can quickly identify the subsystems that are associated with a given Business transaction even when a subsystem is associated with multiple Business Transactions. Further, due to the use of metrics and alerts, the user can quickly ascertain that a given subsystem within a Business Transaction is a problem and focus the diagnosis on that subsystem. The severity of an alert can also guide the user. The metrics which are provided on the UI can be based on data from a managed application in a specified time interval.

FIG. 8D depicts the user interface of FIG. 8B, where a Business Transaction of Options Trading has been selected by the user. In the UI 860, the dependency graph 807 highlights the nodes and edges which are associated with one or multiple instances of Options Trading. The highlighted nodes are: 812, 820, 844, 826, 834, 828 and 836 and the highlighted edges are the arrows between these nodes. An example aggregate response time is 1000 msec. is depicted for TradeService 820. Moreover, alert icons 854 and 852 are associated with nodes 812 and 820, respectively. These metrics may be for a single instance of Place Order or, more commonly, an average over multiple instances of Place Order, such as over a specified time interval.

Note that the alert and metrics for a node or edge can be specific to the selected Business Transaction.

The data which is used to provide the dependency graph can be for a selected time period. In one approach, the user selects a "Live" button 852 so that the data used to provide the dependency graph is constantly updated as time progresses, and the dependency graph itself is updated as the underlying data changes. For example, the data can be selected to represent a rolling window of the last fifteen minutes (or some other default or user-configurable period). In another approach, the user selects the "Historical" button 880 so that the data used to provide the dependency graph is for a fixed, historical time period and is not updated as time progresses. Furthermore, the historical time period can be easily configured by the user by dragging a slider tool 884 on a time bar 882, which represents hours, minutes and seconds in an HH:MM:SS format. In the current configuration of the slider tool, a time period from 13:35:00 to about 13:42:00 is encompassed. For example, the user can use a mouse to drag the entire slider tool, or to extend the right and/or left edges of the slider tool to encompass a larger time period. The slider tool identifies the historical time period, e.g., by its width, when the slider tool is arranged horizontally, or by its height, when the slider tool is arranged vertically.

FIG. 9 depicts a method for providing a user interface. As mentioned, as a managed application executes, relevant component data is obtained through instrumentation of the application. This information can be reported by agents to a central manager. The data at the manager can be provided in a database 118 (FIG. 1) such as at a storage device 310 (FIG. 3). The data can include various data fields which allow the data to be queried and accessed in different ways to achieve the functionality described herein.

At step 900, the data can be accessed for a specified time interval under analysis which can be set to a live time period or a historical time period, as discussed in connection with FIG. 8D. The data can be accessed once, or repeatedly, from a data store, for instance. Step 902 identifies subsystems which were invoked in the time period and their dependencies. The association of subsystems to a Business Transaction can be achieved using special map tracers that report back information about transactions that are occurring; if the transaction matches a Business Transaction Component, then that transaction is labeled with that Business Transaction Component name and all the lower-level components invoked during that transaction are associated with that Business Transaction Component (and thus its Business Transaction). Those lower-level components later get aggregated into "subsystems" based on certain rules. Within the transaction trace, the front end and back end-calls that appear in the graph and the tree are associated with specific metric paths (identifiers) that are appear associated with a segment when that component is hit as part of a traced transaction. So we identify transactions by looking for the selected Business Transaction Component or front end identifier—as the initial segment of the thread. Once a subsystem identifier is found in the transaction trace, we know we're "inside" that subsystem. All the calls made from that point on in the transaction are then necessarily part of the same subsystem (given the level at which we aggregate things in the graph)—until the next recognized subsystem (front end or back end call) is invoked.

Step 904 calculates performance metrics such as average response time, concurrent invocations, errors per interval, responses per interval and stall count. The metrics can be calculated for each Business Transaction, transaction and component. Step 906 determines the alert levels, such as by comparing the performance metrics to respective alert thresholds. Step 908 includes displaying or updating the user interface with the relevant information for the time interval under analysis. Step 908 can also include includes updating the user interface based on user commands.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for visualizing flows through at least a first application, the method comprising:
   accessing a data store to access data regarding the first application, the data is obtained from an agent associated with the first application using instrumentation which is installed in the first application, the data represents multiple instances of the first application;
   displaying a dependency graph on a user interface, the dependency graph graphically depicts: (a) a first node which represents the multiple instances of the first application, (b) a second node which represents one subsystem on which the first application depends when a first preselected component of the first application is invoked, the first application is invoked in a first business transaction by virtue of the first preselected component being invoked, (c) at least one edge which represents a dependency of the first application on the one subsystem, (d) a node which represents another subsystem on which the first application depends when a second preselected component of the first application is invoked, the first application is invoked in a second business transaction by virtue of the second preselected component being invoked, and (e) another edge which represents a dependency of the first application on the another subsystem; and
   responsive to a user selection of the first business transaction: visually distinguishing the node which represents the one subsystem from the node which represents the another subsystem, and visually distinguishing the one edge from the another edge.

2. The computer-implemented method of claim 1, wherein: the at least one edge is decorated with at least one of: an aggregate metric or an alert based on the aggregate metric.

3. The computer-implemented method of claim 1, wherein: the first node is decorated with at least one of: an aggregate metric or an alert based on the aggregate metric.

4. The computer-implemented method of claim 1, wherein: the first node represents different instances of the first application which have different front end components.

5. The computer-implemented method of claim 1, wherein: the first node represents different instances of the first application which are called by different external components.

6. The computer-implemented method of claim 1, wherein: the first node represents one instance of the first application which depends on the one subsystem, and an instance of another application which does not depend on the one subsystem.

7. The computer-implemented method of claim 1, wherein:
the dependency graph graphically depicts: (e) a third node which represents another subsystem, and (f) at least one edge which represents a dependency of the first application on the another subsystem; and
the first node represents one instance of the first application which depends on the one subsystem but not the another subsystem, and another instance of the first application which depends on the another subsystem but not the one subsystem.

8. The computer-implemented method of claim 1, wherein:
when an elapsed time since the first application called the one subsystem exceeds a threshold, the dependency graph graphically depicts aging of the second node.

9. The computer-implemented method of claim 1, wherein:
when an elapsed time since the first application called the one subsystem exceeds a threshold, the dependency graph is updated to remove the second node.

10. The computer-implemented method of claim 1, wherein:
the dependency graph graphically depicts: (e) a third node which represents another subsystem, and (f) at least another edge which represents a dependency of the one subsystem on the another subsystem; and
when an elapsed time since the first application called the one subsystem exceeds an associated threshold, and an elapsed time since the one subsystem called the another subsystem exceeds an associated threshold, the dependency graph graphically depicts aging of the second node.

11. The computer-implemented method of claim 1, wherein:
the dependency graph graphically depicts: (e) a third node which represents another subsystem, and (f) at least another edge which represents a dependency of the one subsystem on the another subsystem; and
when an elapsed time since the first application called the one subsystem exceeds an associated threshold, and an elapsed time since the one subsystem called the another subsystem exceeds an associated threshold, the dependency graph is updated to remove the second node.

12. The computer-implemented method of claim 1, wherein:
the dependency graph can be alternatively provided in a summary view or a detailed view based on a user selection, where in the summary view, the first node represents the multiple instances of the first application without identifying invoked components of the first application, and in the detailed view, the first node represents the multiple instances of the first application while identifying at least one invoked component of the first application.

13. The computer-implemented method of claim 1, wherein:
the data is selected for a historical time period in response to a user selection via a slider tool.

14. The computer-implemented method of claim 1, wherein:
the one subsystem and the another subsystem comprise software components.

15. The computer-implemented method of claim 1, further comprising:
responsive to the user selection of the first business transaction: setting an alert icon for the first node based on aggregated metrics across the multiple instances of the first application which were invoked in connection with the first business transaction but not in connection with the second business transaction.

16. The computer-implemented method of claim 1, further comprising:
responsive to a user selection of the second business transaction: visually distinguishing the node which represents the another subsystem from the node which represents the one subsystem, and visually distinguishing the another edge from the one edge.

17. At least one tangible, non-transitory, processor-readable storage device having processor-readable software embodied thereon for programming at least one processor to perform a method for visualizing flows through respective applications, the method performed comprises:
accessing a data store to access data which is obtained from respective agents associated with the respective applications, the respective agents provide the data using instrumentation which is installed in the respective applications, the data represents multiple instances of each of the respective applications;
displaying a dependency graph on a user interface, the dependency graph graphically depicts: (a) a first node which represents multiple instances of one application of the respective applications, (b) a second node which represents multiple instances of another application of the respective applications, and (c) at least one edge which represents a dependency of the one application on the another application, the one application depends on the another application when a first preselected component of the one application is invoked, the one application is invoked in a first business transaction by virtue of the first preselected component being invoked, and the one application depends on the another application when a second preselected component of the one application is invoked, the one application is invoked in a second business transaction by virtue of the second preselected component being invoked; and
responsive to a user selection of the first business transaction: setting an alert icon for the first node based on aggregated metrics across the multiple instances of the one application which were invoked in connection with the first business transaction but not in connection with the second business transaction.

18. The at least one tangible, non-transitory, processor-readable storage device of claim 17, wherein:
at least one instance of the multiple instances of the one application calls at least one instance of the multiple instances of the another application via a web service, and the dependency graph graphically depicts the web service.

19. The at least one tangible, non-transitory, processor-readable storage device of claim 17, wherein:
at least one instance of the multiple instances of the one application calls at least one instance of the multiple instances of the another application via a cross-JVM call.

20. The at least one tangible, non-transitory, processor-readable storage device of claim 17, wherein:
the first node represents at least one instance of the multiple instances of the one application which calls at least one instance of the multiple instances of the another application, and another instance of the multiple instances of the one application which does not call at least one instance of the multiple instances of the another application.

21. A computer-implemented method for visualizing flows through at least a first application, comprising the computer-implemented steps of:

accessing a data store to access data regarding the first application, the data is obtained from an agent associated with the first application using instrumentation which is installed in the first application, the data represents multiple instances of the first application;

displaying a dependency graph on a user interface, the dependency graph graphically depicts: (a) a first identifier which represents a first business transaction in which the first application is invoked, (b) a node which represents the multiple instances of the first application, (c) a node which represents one subsystem on which the first application depends, in connection with the first business transaction, (d) one edge which represents a dependency of the first application on the one subsystem in connection with the first business transaction, (e) a second identifier which represents a second business transaction in which the first application is invoked, (f) a node which represents another subsystem on which the first application depends, in connection with the second business transaction, and (g) another edge which represents a dependency of the first application on the another subsystem in connection with the second business transaction; and responsive to a user selection of the first identifier which represents the first business transaction, visually distinguishing the node which represents the one subsystem over the node which represents the another subsystem, and the one edge over the another edge.

22. The computer-implemented method of claim 21, wherein:

the first identifier is graphically depicted by a node connected by at least one edge to the node which represents the multiple instances of the first application.

23. The computer-implemented method of claim 21, wherein:

responsive to the user selection of the first business transaction, visually distinguishing the first identifier which represents the first business transaction over the second identifier which represents the second business transaction.

24. The computer-implemented method of claim 21, wherein:

the first application is invoked in the first business transaction by virtue of at least a first preselected component of the first application being invoked; and the first application is invoked in the second business transaction by virtue of at least a second preselected component of the first application being invoked.

* * * * *